US012015973B2

(12) United States Patent
Gokturk et al.

(10) Patent No.: US 12,015,973 B2
(45) Date of Patent: Jun. 18, 2024

(54) METHODS FOR LINK AND PATH QUALITY ASSESSMENT

(71) Applicant: AIRTIES S.A.S., Paris (FR)

(72) Inventors: Muharrem Sarper Gokturk, Istanbul (TR); Metin Ismail Taskin, Istanbul (TR)

(73) Assignee: AIRTIES S.A.S., Paris (FR)

( * ) Notice: Subject to any disclaimer, the term of this patent is extended or adjusted under 35 U.S.C. 154(b) by 0 days.

(21) Appl. No.: 18/104,057

(22) Filed: Jan. 31, 2023

(65) Prior Publication Data
US 2023/0254752 A1 Aug. 10, 2023

Related U.S. Application Data

(63) Continuation of application No. 16/479,548, filed as application No. PCT/EP2018/051135 on Jan. 17, 2018, now Pat. No. 11,570,686.

(30) Foreign Application Priority Data

Jan. 20, 2017 (GB) .................................. 1700997

(51) Int. Cl.
H04W 40/12 (2009.01)
H04B 17/309 (2015.01)
(Continued)

(52) U.S. Cl.
CPC .......... H04W 40/12 (2013.01); H04B 17/309 (2015.01); H04L 43/0888 (2013.01);
(Continued)

(58) Field of Classification Search
CPC ..... H04W 40/12; H04W 40/28; H04W 88/06; H04B 17/309; H04L 43/0888;
(Continued)

(56) References Cited

U.S. PATENT DOCUMENTS 5,754,543 A 5/1998 Seid
5,933,425 A 8/1999 Iwata
(Continued)

FOREIGN PATENT DOCUMENTS

EP 0 830 047 3/1998
EP 1 376 939 1/2004
(Continued)

OTHER PUBLICATIONS

Singh et al., "Enhancing AODV performance by improved link metrics," Fifth International Conference on Information and Automation for Sustainability, pp. 183-188 (Dec. 2010).

Primary Examiner — Nishant Divecha
(74) Attorney, Agent, or Firm — Volpe Koenig

(57) ABSTRACT

A method for assessing path quality between a source node and a destination node, the method comprising, at a node: determining a first parameter and a first path classification of a first path having at least one link; determining a second parameter and a second path classification of a second path having at least one link; determining the quality of the first path based on the first parameter and the first path classification; determining the quality of the second path based on the second parameter and the second path classification; and comparing the quality of the first path and the quality of the second path thereby to determine the best quality path.

18 Claims, 12 Drawing Sheets

(51) Int. Cl.
  *H04L 43/0888* (2022.01)
  *H04L 45/12* (2022.01)
  *H04L 45/125* (2022.01)
  *H04W 40/28* (2009.01)
(52) U.S. Cl.
  CPC .......... *H04L 45/123* (2013.01); *H04L 45/124* (2013.01); *H04L 45/125* (2013.01); *H04W 40/28* (2013.01)
(58) Field of Classification Search
  CPC ... H04L 45/123; H04L 45/124; H04L 45/125; H04L 45/22; H04L 45/70
  See application file for complete search history.

(56) References Cited

U.S. PATENT DOCUMENTS

| | | | |
|---|---|---|---|
| 6,212,188 B1 | 4/2001 | Rochberger et al. | |
| 8,149,715 B1 | 4/2012 | Goel et al. | |
| 2005/0239410 A1* | 10/2005 | Rochester, III | H04B 17/26 455/67.11 |
| 2006/0268749 A1 | 11/2006 | Rahman et al. | |
| 2008/0056138 A1 | 3/2008 | Saitoh | |
| 2009/0168653 A1 | 7/2009 | St. Pierre et al. | |
| 2010/0061264 A1 | 3/2010 | Campbell et al. | |
| 2013/0301435 A1* | 11/2013 | Panah | H04W 4/023 370/252 |
| 2014/0269691 A1* | 9/2014 | Xue | H04L 45/38 370/392 |
| 2014/0313885 A1 | 10/2014 | Wen | |
| 2015/0055506 A1* | 2/2015 | Birlik | H04W 72/27 370/254 |
| 2015/0350059 A1 | 12/2015 | Chunduri et al. | |
| 2015/0372899 A1 | 12/2015 | Shibata et al. | |
| 2017/0019327 A1* | 1/2017 | Lee | H04W 40/04 |

FOREIGN PATENT DOCUMENTS

| | | |
|---|---|---|
| GB | 2 545 659 | 6/2017 |
| WO | 2013/025350 | 2/2013 |
| WO | 2014/143226 | 9/2014 |
| WO | 2014/186062 | 11/2014 |

\* cited by examiner

METHODS FOR LINK AND PATH QUALITY ASSESSMENT

CROSS REFERENCE TO RELATED APPLICATIONS

This application is a continuation of U.S. patent application Ser. No. 16/479,548 filed on Jul. 19, 2019 which issued as U.S. Pat. No. 11,570,686 on Jan. 31, 2023, which is the U.S. National Stage, under 35 U.S.C. § 371, of International Application No. PCT/EP2018/051135 filed on Jan. 17, 2018, which claims priority to Great Britain Patent Application No. 1700997.8 filed Jan. 20, 2017 the contents of which are hereby incorporated by reference herein.

FIELD OF THE INVENTION

The invention relates to the assessment of the quality of communication between nodes in a communication network. In particular, but not exclusively, the invention relates to the assessment of the quality of communication between nodes, and path selection, in a wireless network.

BACKGROUND OF THE INVENTION

It is known in the art that communication networks are composed of nodes that are connected to each other via at least one interface. An interface is defined as the device, or a module in a device, that manages communications on one communication medium. Hence, 'wireless interface' denotes the module that manages communication at the wireless medium. Likewise, an 'Ethernet interface' manages communication that takes place on the Ethernet. An interface manages communication on one physical medium. An interface can be divided into multiple logical interfaces each of which governs an individual communication link. The logical interfaces, which are rooted from the same interface, share the same physical medium. To illustrate, consider a Wi-Fi device, which operates on both the 2.4 GHz band and the 5 GHz band. This device employs two separate interfaces, one managing communication on the 2.4 GHz band, and the other one managing communication on the 5 GHz band. Further, each interface may employ logical interfaces to manage multiple individual links on the interface.

Wireless networks are examples of networks in which nodes are connected via wireless interfaces. Similarly, power line communication (PLC) networks consist of nodes that communicate with each other through power line interfaces. Ethernet networks are formed by nodes that are connected to each other through Ethernet interfaces. These examples, on different networks, can be extended easily based on the communication technology being used between the nodes that make up the network. Furthermore, some networks may employ nodes which can communicate with one another through multiple interfaces simultaneously. Such networks are named as hybrid networks in the literature.

Mesh networks are the type of networks where each node can communicate with one another directly, or through other nodes in the network. Hybrid mesh networks are mesh networks in which all, or some part of the nodes, have more than one interface where each interface can utilize different communication media to communicate with one another.

In communication networks, the connection quality of a link is the main parameter that defines the achievable capacity on a link. The assessment of this quality is especially important because the nodes decide to utilize, or not to utilize, a given link based on its quality. Furthermore, nodes dynamically select the mode of operation and communication rate on a link based on the assessed quality of the link. To illustrate, consider a link between a wireless access point (AP) and a station (STA) connected to it. For example, when the observed signal-to-interference-plus-noise ratio (SINR) on the AP to the STA link is high, say 30 dB, an AP can transmit with dense modulation schemes and coding rates, resulting in high bit rates. In contrast, when the observed SINR is low, say 5 dB, then the AP should use robust, but less dense, modulation methods and coding rates that yield low bit rates. That is to say, quality of the link is the governing factor on the capacity of the link.

Nonetheless, it would be misleading to assess the quality of a link by only considering the SINR on the link, as the SINR is not the only factor that governs the quality of a link. For example, in carrier sense multiple access (CSMA) systems, nodes listen before they talk, and thus, as the number of nodes that contend for the medium increases, the share taken from the medium by each contender is reduced. Furthermore, contention of multiple nodes may result in packet collisions in the medium. Thus, although the SINR is high, it does not guarantee high bit rates on the link, due to the medium sharing, achievable capacity on a link may vary considerably.

One parameter that is commonly used in assessing the quality of a link is the last successful transmission rate observed on that link. That is to say, if the last successful frame was transmitted with a rate of R Mbps, then the link is said to have a capacity of R Mbps. This may provide a valid forecast for a single frame if the link quality changes rapidly, or for multiple frames if the link does not undergo abrupt changes. Nonetheless, although the last successful packet transmitted on a link is a means for measuring the achieved rate for the last frame, it is not the sole determining factor for the achievable rate. Moreover, one can clearly argue that the last successful packet may not be representative for the actual capacity of the link as the transmitter may choose to send the frame with any rate that suits its traffic generation rates. For example, a transmitter may choose to send some frames with low rates, whereas it opts for high rates for other frames. That is being said, however, the logical choice would be to transmit a frame with the highest rate possible.

SUMMARY OF THE INVENTION

In order to mitigate for at least some of the above-described problems, there is provided a method for assessing path quality between a source node and a destination node, the method comprising, at a node: determining a first parameter and a first path classification of a first path having at least one link; determining a second parameter and a second path classification of a second path having at least one link; determining the quality of the first path based on the first parameter and the first path classification; determining the quality of the second path based on the second parameter and the second path classification; and comparing the quality of the first path and the quality of the second path thereby to determine the best quality path.

Further, there is provided a method for determining a link metric for comparison of the quality of different communication technologies, the method comprising, at a metric module: determining a measurement of quality for a link using a communication technology; converting the measurement of quality to an expected throughput based on the communication technology used on the link; determining the link metric of the link based on the expected throughput, thereby to allow the direct comparison of link metric qualities of different communication technologies; and outputting the link metric.

DETAILED DESCRIPTION OF AN EMBODIMENT OF THE INVENTION

A detailed description of an embodiment of the invention is described with reference to the figures, in which.

Further aspects of the invention will be apparent from the description and the appended claims.

In communication networks, the connection quality of a link is the main parameter that determines the achievable capacity on that link. The present invention is related to assessing the quality of individual links in a communication network, such as the links depicted in the communication network described below with reference to FIG. 1. Further, the invention is related to assessing the quality of the end-to-end paths that are made up of these links. Examples of measurements of quality include physical parameters, physical sample rates, signal to noise ratio, signal to interference plus noise ratio, modulation and coding scheme index values, available airtime, interference and signal strength.

Figure 1:
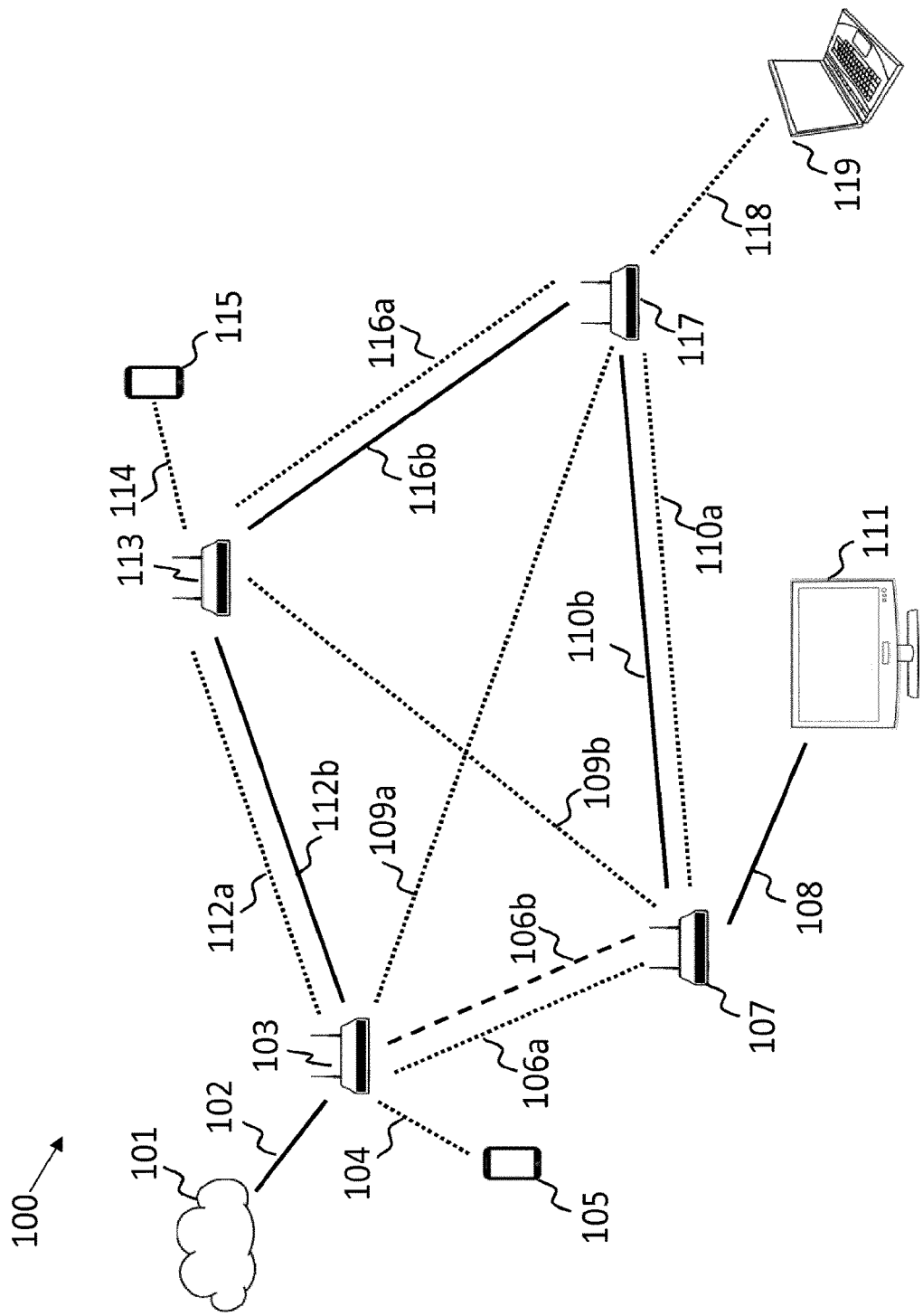
FIG. 1 shows a hybrid network according to an embodiment of the invention.

FIG. 1 depicts an exemplary hybrid network 100 in which the present invention can be implemented. In FIG. 1 there is shown a first node 103 that is connected to the internet 101 via an Ethernet link 102. The first node is in communication with a second node 107 via a PLC link 106b and a wireless link 106a. The first node 103 is also in communication with a third node 113 via a wireless link 112a and an Ethernet link 112b. The first node 103 is also in communication with a fourth node 117 via a wireless link 109a. The second node 107 is in communication with the third node 113 via a wireless link 109a. The second node 107 is also in communication with the fourth node 117 via a wireless link 110a and an Ethernet link 110b. The third node 113 is in communication with the fourth node 117 via a wireless link 116a and an Ethernet link 116b.

There are four client devices 105, 111, 115 and 119 that are also shown in the hybrid network 100 of FIG. 1. Client device 105 is in communication with the first node 103 via a wireless link 104. Client device 111 is in communication with the second node 107 via an Ethernet link 108. Client device 115 is in communication with the third node 113 via a wireless link 114. Client device 119 is in communication with the fourth node 117 via a wireless link 118.

Whilst the hybrid network 100 of FIG. 1 has four nodes 103, 113, 107, 117, in further examples, the hybrid network 100 may have any number of nodes. In yet further examples, there may be any number of client devices operating within the hybrid network 100. In still further examples, the type of communication link between the nodes and/or client devices in the network 100 may comprise any number and type.

Whilst the invention is described in relation to a hybrid network, in particular a wireless network, the invention can be applied to communication networks in general. The explained techniques may be applied to any communication network.

The method described herein utilise a selected set among the observed successful rates and these selected rate samples are converted into a "metric" that designates the cost of using the link. In an exemplary embodiment, the metric is a non-linear (logarithmic) function of the attainable rate on that link. Said in a different way, the metric is a linear function of the airtime, which designates the amount of time spent for transmission of one unit of data, e.g., one bit, on the link. For example, if high transmission rates can be achieved on a link, then the airtime usage is low, i.e., the transmission on this link does not consume much of the shared medium; thus yielding a low metric value, i.e., low cost. On the contrary, if the link can only support low transmission rates, then the transmissions on this link takes long duration of time; and thus yielding a high metric value, i.e., high cost. In summary, a low metric value represents a low cost, and a high metric value designates a high cost.

The proposed metric is additive, and thus, it can be used to compute an end-to-end metric that designates "the end-to-end metric" of a path (route) which may be comprised of multiple nodes (such as the nodes shown in FIG. 1). Moreover, the metric of a single link is an absolute value, i.e., there is a minimum and a maximum value it can attain, facilitating comparison of different technologies that can achieve a wide range of capacities. Due to this, the proposed metric provides a transparent parameter that provides evaluation and comparison of different technologies that are utilised on the same network simultaneously; and thus, making it especially suitable for hybrid networks. For example, by the use of the proposed metric, a PLC link and a Wi-Fi link can be compared, although each employs a different technology at the physical layer and the data link layer, in particular, MAC layer, which achieves different capacities.

The metric module carries out the proposed metric computation. The components and the flow within the metric module is depicted in FIG. 2.

Figure 2:
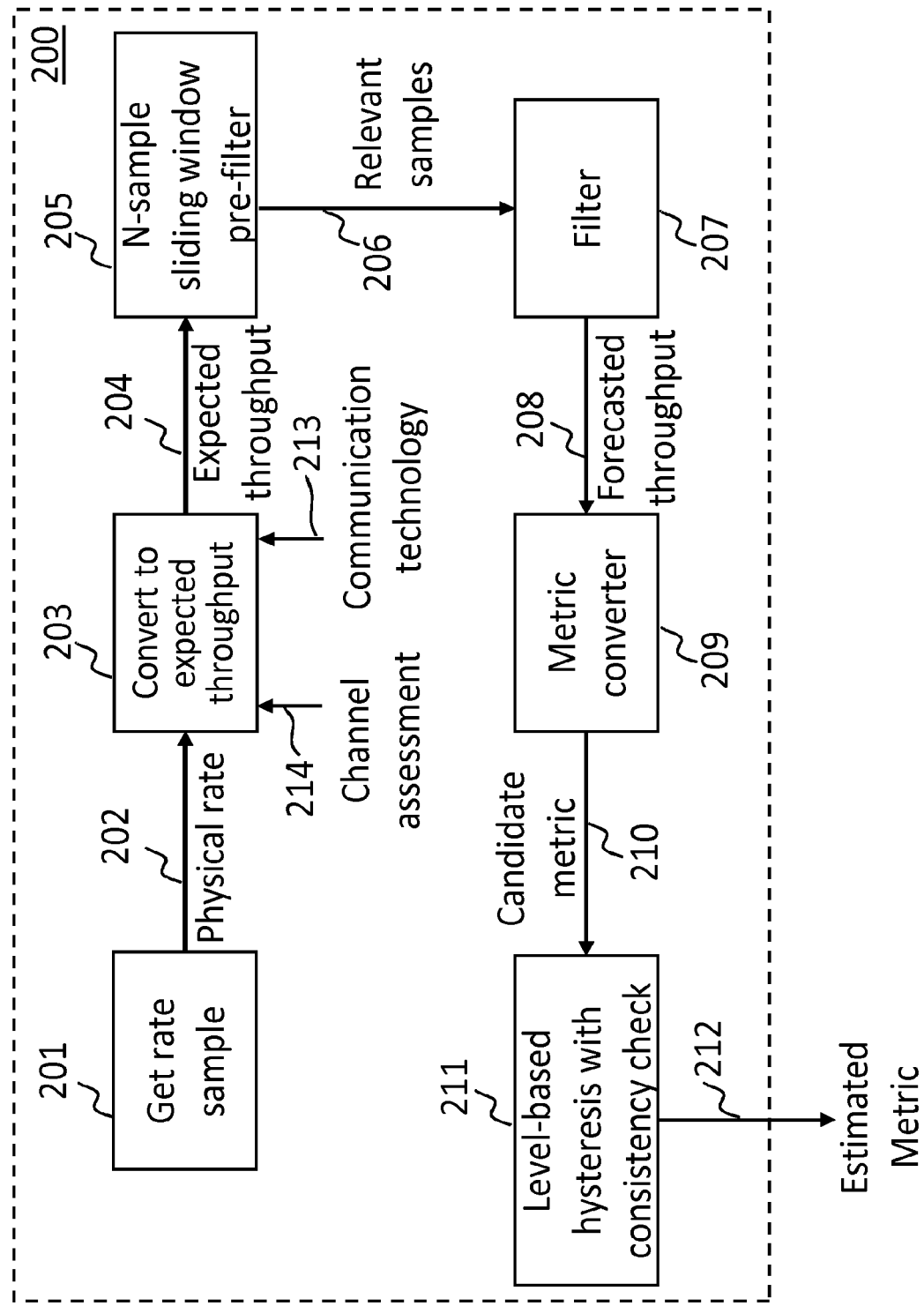
FIG. 2 is a metric module according to an embodiment of the invention.

FIG. 2 shows a metric module 200 that processes a metric computation, according to an embodiment of the invention. The metric module 200 includes a number of components that are used to provide an estimated metric. The components represent both processes and means of processing signals as part of a process flow that is implemented at the metric module 200.

Metric module 200 gets the physical rate of the last transmitted frame on for which a metric is to be produced at component 201. Component 201 gets the rate samples periodically. The rate of sampling is set to 1 second in the exemplary embodiment. Further embodiments may get the rate samples in a non-periodic fashion. The rate sample that is received at component 201 is passed to a converter 203. The rate sample received at component 201 is passed to the converter 203 over the communication path 202 and is converted to an expected throughput value based on the communication technology 213 being used on the link.

Examples of different communication technologies include IEEE 802.11ac, IEEE 802.11n, IEEE 1091, Homeplug AV2, MoCA, Ethernet, etc. The converter 203 facilitates comparison of different technologies based on a common parameter, the throughput, i.e., successfully transmitted data bits in 1 second.

The throughput conversion performed at the converter 203 is advantageous when compared to using the physical rate directly, especially in cases where different technologies have different ranges of physical rate and corresponding throughput. A communication technology that is capable of transmitting with a very high physical rate may incur overhead due to channel access or messaging whereas another technology that is slow in transmission physical rate may incur negligible channel access and messaging overhead. Due to this reasoning, for a meaningful comparison between two different technologies, one needs to compare the achievable throughput, but not the physical transmission rate, which may be misleading.

In an example, the converter 203 is a look-up table. In a further example, the converter 203 performs a function that gets the physical rate and underlying communication technology as an input 213, i.e., f(r,t), and returns the expected throughput (or goodput). The underlying communication technology 213 is specified in detail through a set of parameters used by the node, such as the MAC protocol, e.g., 802.11ac, number of antennas employed by the transmitter and the receiver, e.g., 3×3, bandwidth allocated for communication, e.g., 80 MHz. Further embodiments may utilize as many parameters as possible to calculate the expected throughput. For example, an input of channel assessment results 214 can be utilized to learn the amount of free airtime in the shared medium. Moreover, hardware limitations can be incorporated into the calculation. For instance, the expected throughput of an Ethernet port which is capable of transferring at most 100 Mbps, can be capped at 100 Mbps.

The expected throughput that is determined at converter 203 is passed to a pre-filter 205. The pre-filter 205 is an N-sample sliding window pre-filter 205 that works on the last received N expected throughput samples. Note that throughput converter 203 outputs a single value, but the pre-filter 205 works on N samples; thus the pre-filter 205 stores N throughput samples. The pre-filter 205 works on a first-in first-out basis, in that when the (N+1)th sample arrives at the pre-filter 205, the first sample entered into the window, i.e., the 1st sample, leaves the window first. In an exemplary embodiment, N is set to 31 samples. The flow diagram for the N-sample sliding window pre-filter is given with reference to FIG. 3.

Figure 3:
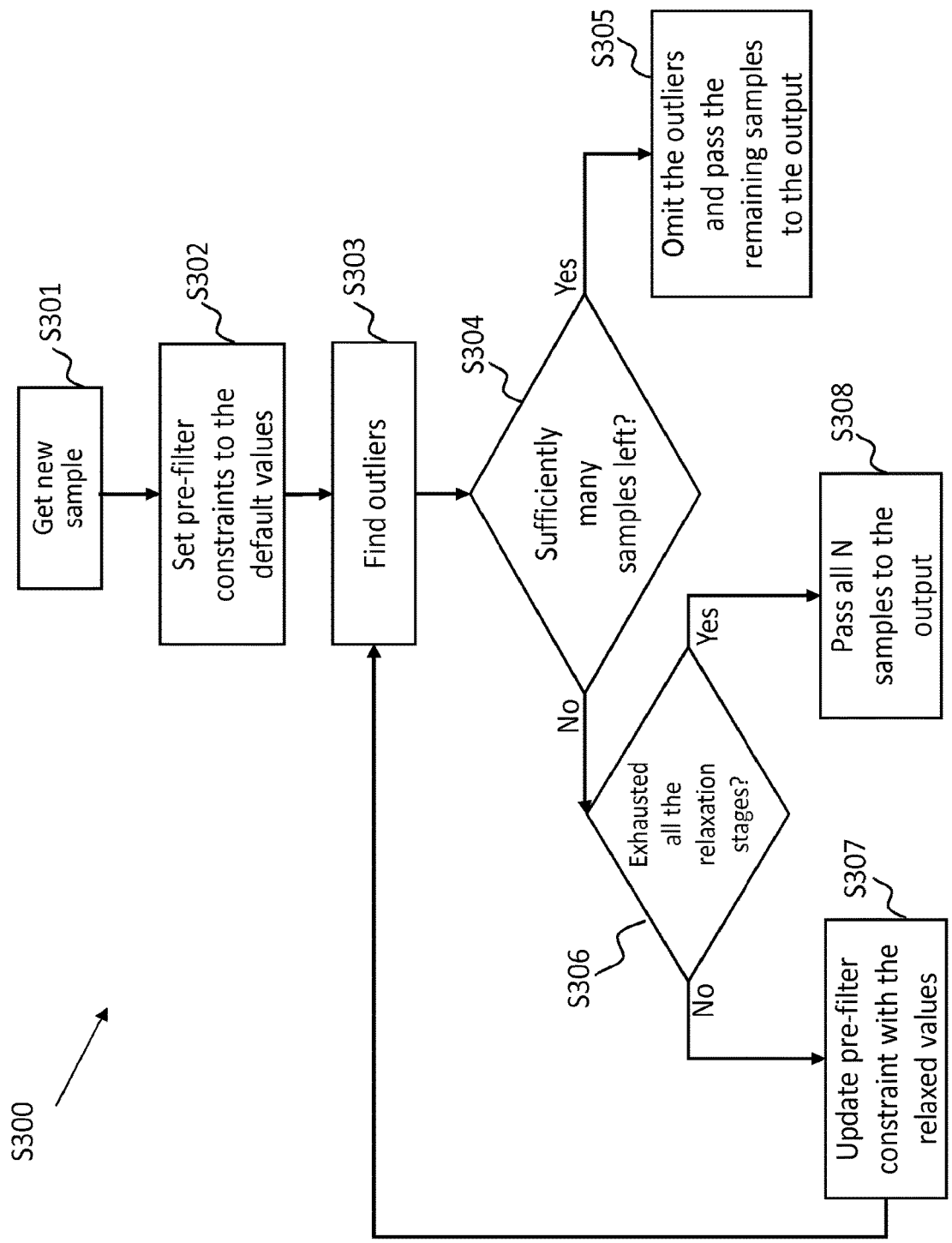
FIG. 3 is a flow diagram illustrating the processes performed at a pre-filter.

FIG. 3 is a flow diagram illustrating the processes performed at a pre-filter 205. The job of the pre-filter 205 is to detect and omit the outlier samples from the sample set. At step S301 of FIG. 3, the pre-filter 205 receives a new sample. The pre-filter 205 is configured with predetermined constraints at step S302. The process moves to step S303. At step S303, outliers are identified, that is to say, samples that are outside a predetermined configurable percentage of the standard deviation can be omitted from the sample set. The pre-filter 205 can employ multiple stages with different outlier detection thresholds. For example, in the first stage, only the samples, xs, that satisfy x<μ+0.1σ and x>μ−0.1σ can be accepted (where is p the mean and a is the standard deviation). If there are less than a predetermined number of samples remaining in the sample set after the outlier removal, N samples can be input to the second stage where the outlier detection thresholds are relaxed. For example, the constraints of the second stage can be x<μ+1.0σ and x>μ−1.0σ. Once outliers have been identified, the process moves to step S304. At step S304, it is asked whether there is a sufficient number of samples left. An important point to consider in the pre-filter 205 is that there must be a reasonable number of sample points at the output of the pre-filter 205.

If there is a sufficient number of samples left, the process moves to step S305, where the outliers are omitted and the remaining samples are passed to the output of the pre-filter 205.

If the number of samples at the output of the pre-filter 205 is below a predetermined value, then there are insufficient samples left and the process moves to step S306, where it is asked if all of the constraints of the pre-filter 205 have been relaxed. Relaxing the constraints allows for a greater number of samples to be retained. If, at step S306, it is determined that all of the relaxation stages have not been exhausted, then the constraints are relaxed and the process moves to step S307, where samples are filtered according to the updated filter constraints. The process moves back to step S303 and the outliers, based on the changed constraints, are determined and the process continues accordingly.

If, at step S306 it is determined all of the relaxation stages have been exhausted, then the process moves to step S308, where it is determined that the samples are dispersed and none of them can be regarded as outlier, then all N samples are output by the pre-filter 205.

Once the pre-filter 205 has determined the samples to be outputted, those outputted samples are passed to the filter 207. The job of the filter 207 is to output a single throughput value based on the samples provided by the N-sample sliding window pre-filter 205. This filter 207 can be simply an averaging filter in that it outputs the average of the samples provided by pre-filter 205, or it can be a median filter, or it can be a complex function incorporating a forecasting method that finds an estimate based on the provided sample set. Once the filter 207 has provided a single throughput value, that value is passed to the metric converter 209.

The job of the metric converter 209 is to map the input throughput value to a quantized number. An exemplary metric converter function is shown in equation 1:

$$\text{metric} = \left\lfloor \frac{K}{\left\lfloor \frac{R}{L} \right\rfloor + 1} \right\rfloor \qquad \text{Equation (1)}$$

Here, the symbol: [ ] denotes floor operator, K is a predetermined number that designates the worst metric that can be output by the metric converter, and R represents the throughput output 208 (in Mbps), and L is the step size for the quantization. A typical K can be 50000 and a typical L can be 20. According to Equation (1), with K=50000, and L=20, the metric is computed as 50000 for R less than 20, and the metric is calculated as 5000 for R greater and equal to 180 up to 200. Note that, in this example, the metric is a uniformly quantized value, i.e., it is a staircase type of function in terms of the throughput. In further embodiments the metric can be a non-uniformly quantized value, or different metric conversion functions can be employed.

The metric provided by the metric converter 209 is a candidate metric which may or may not be used as the current metric in the assessment of the link quality for which the candidate metric is computed.

Using equation 1, a metric array of possible values can be provided, whereby the worst metric value, K, is the upper value of the array, and there are other possible values for a metric to take, determined by the step size for the quantization. In an example, using equation 1, where the floor operator provides the greatest integer higher provided by the calculation, a metric array which quantizes throughput rates from zero to 1000 Mbps with constant step size of 20 Mbps, where the worst metric output is 50000, is computed to be m=[50000, 25000, 16666, 12500, 10000, 8333, 7142, 6250, 5555, 5000, 4545, 4166, 3846, 3571, 3333, 3125, 2941, 2777, 2631, 2500, 2380, 2272, 2173, 2083, 2000, 1923, 1851, 1785, 1724, 1666, 1612, 1562, 1515, 1470, 1428, 1388, 1351, 1315, 1282, 1250, 1219, 1190, 1162, 1136, 1111, 1086, 1063, 1041, 1020, 1000, 980].

A metric array can be used to determine whether a calculated candidate metric might be used as the current metric in order to perform a comparison of the quality of the link that produced the candidate metric, or not. This is described in further detail, below.

Once the metric converter 209 has produced a candidate metric, the candidate metric is passed to a consistency check component 211.

The job of level-based hysteresis with consistency check 211 is to decide on the actual metric output of the metric module and to output the metric at path 212. The candidate metric received from the metric converter 209 is selected to be the actual output of the metric module based on the consistency of its occurrence. The level of consistency is measured in terms of the number of consecutive occurrences of a candidate metric. Moreover, different consistency levels are defined based on the discrepancy between the current metric and the candidate metric.

The operation of level-based hysteresis with consistency check 211 is depicted in the flow diagram given in FIG. 4, and the details of the operation are presented in the algorithm, below.

Figure 4:
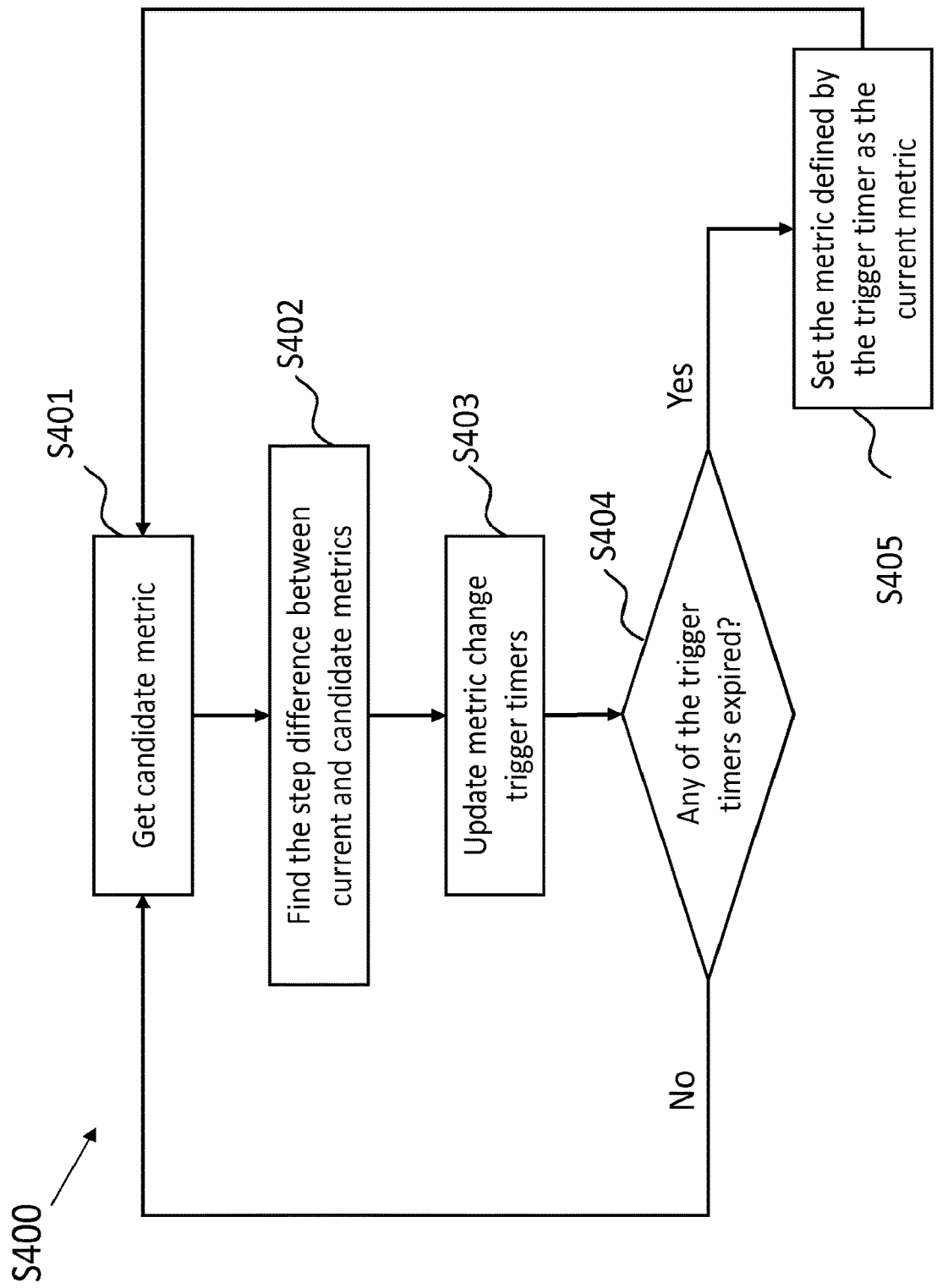
FIG. 4 is a flow diagram for providing the level-based hysteresis with consistency check.

FIG. 4 is a flow diagram S400 that shows a process for providing the level-based hysteresis with consistency check, as described at element 211 of FIG. 2.

The process starts at step S401, where the candidate metric is obtained. The process then moves to step S402, where the step difference between the current metric and the candidate metric is determined. The process then moves to step S403, where the metric change trigger timers are updated. The process then moves to step S404, where it is determined if any of the trigger timers have expired. If any of the trigger timers have expired, the process moves to step S405, where the metric defined by the trigger timer is set as the current metric. The process then moves back to step S401. If it is determined at step S404 that none of the trigger timers have expired, the process moves back to step S401.

Therefore, the consistency check is used to update the metric if the link is observed to consistently attain the candidate metric level. The wireless medium is prone to errors and variations that occur as a result of sudden and imminent small and large scale fading, therefore the consistency check is important. Nonetheless, these errors and variations are not the only sources of sudden unexpected drops in the observed physical transmission rate. The physical rate can rise or drop due to rate adaptation algorithm or due to collisions which necessitate packet retransmissions with slowed down rates. Due to these packet failures, the achievable capacity of the link may be misperceived.

An example of the implementation of an algorithm to provide a consistency check is as follows:

Firstly, the rate sample is obtained, the expected throughput is computed and the candidate metric is computed.

Secondly, the algorithm is implemented in accordance with the flow diagram of FIG. 4. Therefore, in accordance with step S402, the candidate metric is compared with the current metric. In order to do this, the index of the current metric ($C_i$) and the candidate metric ($L_i$) in the metric array (m) are found, where $C_i$ is the index of current metric in the metric array, $L_i$ is index of last metric in the metric array and m is an array of possible metric values.

As described above, in an example, the metric array which quantizes throughput rates from zero to 1000 Mbps with constant step size of 20 Mbps is computed to be m=[50000, 25000, 16666, 12500, 10000, 8333, 7142, 6250, 5555, 5000, 4545, 4166, 3846, 3571, 3333, 3125, 2941, 2777, 2631, 2500, 2380, 2272, 2173, 2083, 2000, 1923, 1851, 1785, 1724, 1666, 1612, 1562, 1515, 1470, 1428, 1388, 1351, 1315, 1282, 1250, 1219, 1190, 1162, 1136, 1111, 1086, 1063, 1041, 1020, 1000, 980].

If the current metric is 10000, then its corresponding index is 5. Likewise, if the candidate metric is 12500, then its corresponding index is 4. In this example, the step difference between the candidate and the current metric is 1 step.

Thirdly, the process then moves to step S403, where for each integer t (0<t<T), where T is the maximum number of steps considered in consistency check, the trigger condition is checked and trigger timers are updated:

If $C_i \geq L_i + t$, then Set Rpt=Rpt+1; Rmt=0;

If $C_i \leq L_i - t$ then set Rmt=Rmt+1; Rpt=0;

Where:

Rpt: Number of times candidate metric is observed to be higher than the current metric by t steps or more.

Rmt: Number of times candidate metric is observed to be lower than the current metric by t steps or more.

Specifically, Rp4 is the number of times the candidate metric is observed to be higher than the current metric by 4 steps or more, and Rm4 is the number of times the candidate metric is observed to be lower than the current metric by 4 steps or more.

For example, for t=3, if $C_i \geq L_i + 3$, then set Rp3=Rp3+1; Rp2=Rp2+1; Rp1=Rp1+1; Rm4=0; Rm3=0; Rm2=0; Rm1=0;

Likewise, if $C_i \leq L_i - 3$, then Set Rm3=Rm3+1; Rm2=Rm2+1; Rm1=Rm1+1; Rp4=0; Rp3=0; Rp2=0; Rp1=0;

Fourthly, the process then moves to step S404, where it is determined if any of the trigger timers have expired and the consistency threshold is checked:

If (Rpt≥Tpt or Rmt≥Tmt for any t), then the candidate metric is set as the actual output metric. Set i=0; Rmt=0, for every t.

Where:

Tpt: Consistency (time) threshold for triggering an increase in the metric output for t steps or more increase.

Tmt: Consistency (time) threshold for triggering a decrease in the metric output. E.g. Tp4=Tm4=10 samples, Tp3=Tm3=75 samples, Tp2=Tm2=150 samples, Tp1=Tm1=300 samples.

Finally, the process returns to the first step S401. Once the metric module 200 has performed a consistency check 211, the estimated metric is output 212. Whilst the metric module 200 is described with respect to monitoring physical rate at component 201, in further examples, different measurements of quality can be made at component 201, such as measurements of physical parameters, signal to noise ratio, signal to interference plus noise ratio, modulation and coding scheme index values, available airtime, interference and signal strength.

The metric module 200 adapts its assessment within a time frame. If the difference between the current and the candidate metric is high, the metric is updated quickly. However, if the difference is small, then the metric is updated slowly, i.e., within a time frame. This means that the metric module adapts to small changes in the medium rather slowly, and adapts to the big changes in the medium rather quickly. To illustrate, the metric module 200 would update its metric from 7142 to 6250 only after having observed that the candidate metric is 6250 for 300 consecutive samples. However, the same metric module 200 would update its metric from 12500 to 6250 only after having observed that the candidate metric is 8333 for 10 consecutive samples.

The level-based hysteresis with consistency check 211 employs a quick drop policy. That is to say, when candidate metric is observed to have the minimum metric (50000) for a pre-determined system defined duration, e.g., Tp4, metric is updated to be 50000, independent of the current metric level.

Figure 6:
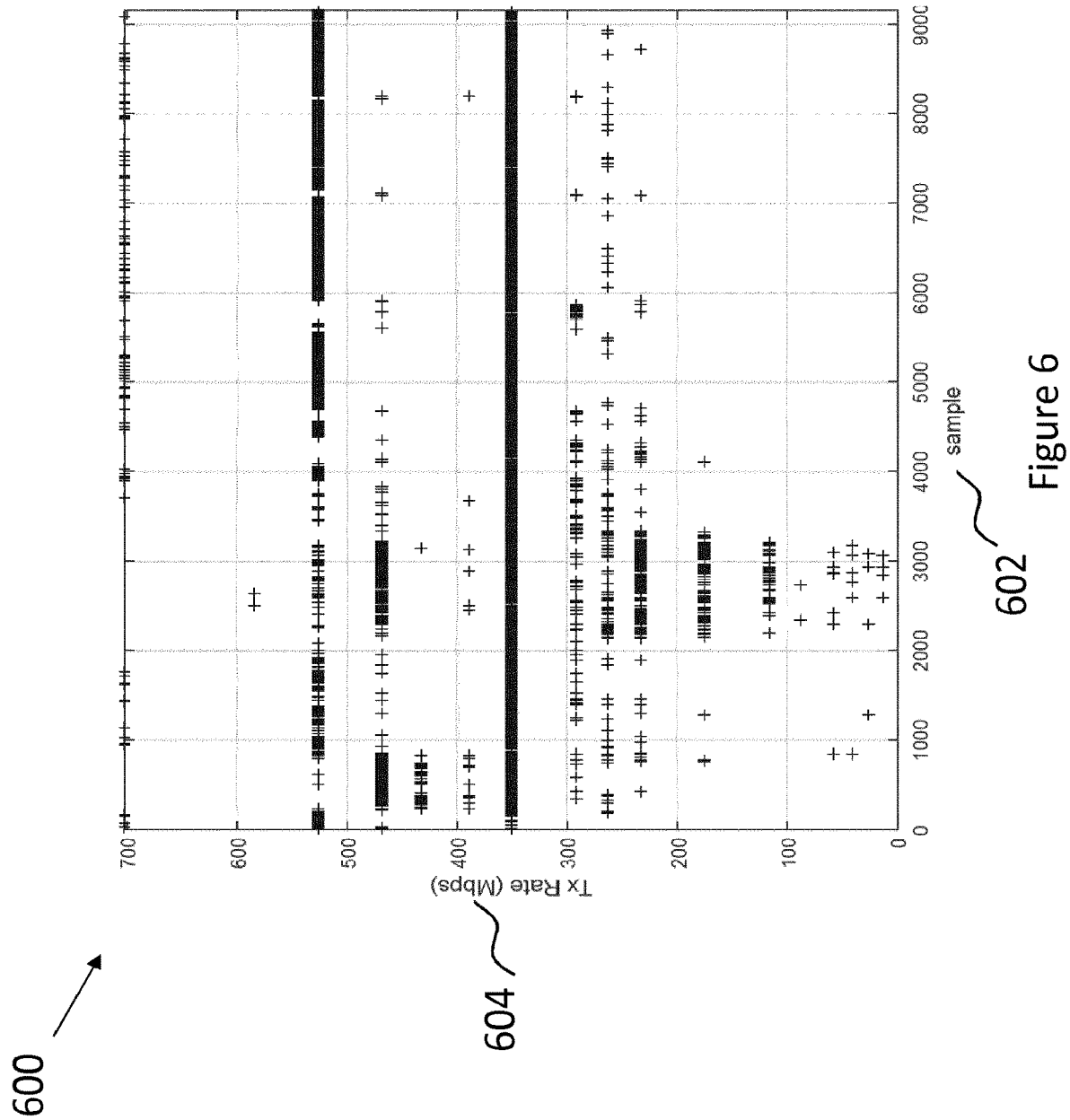
FIG. 6 is a graph showing the physical rate samples of network link.

FIG. 6 shows a graph 6000 that depicts the physical rate samples of an actual link with a sampling rate of 1 second per sample. The horizontal axis 602 of the graph 600 relates to the sample number of a sample. The vertical axis 604 of the graph 600 relates to the physical rate of a sample, measured in Mbps. In FIG. 6, each sample is marked with a "+" sign. From FIG. 6, it is clear that the physical rate can change within a broad range even for a rather stable link. If the link quality were assessed based on the observed physical rate without utilizing the described metric module 200, then this would lead to frequent route changes.

It is important to note that a transmitter should be robust to small changes that may occur in the physical transmission medium, and the routing mechanism's assessment of the link quality should not be affected by these small variations. To illustrate, consider the example scenario in FIG. 5.

Figure 5:
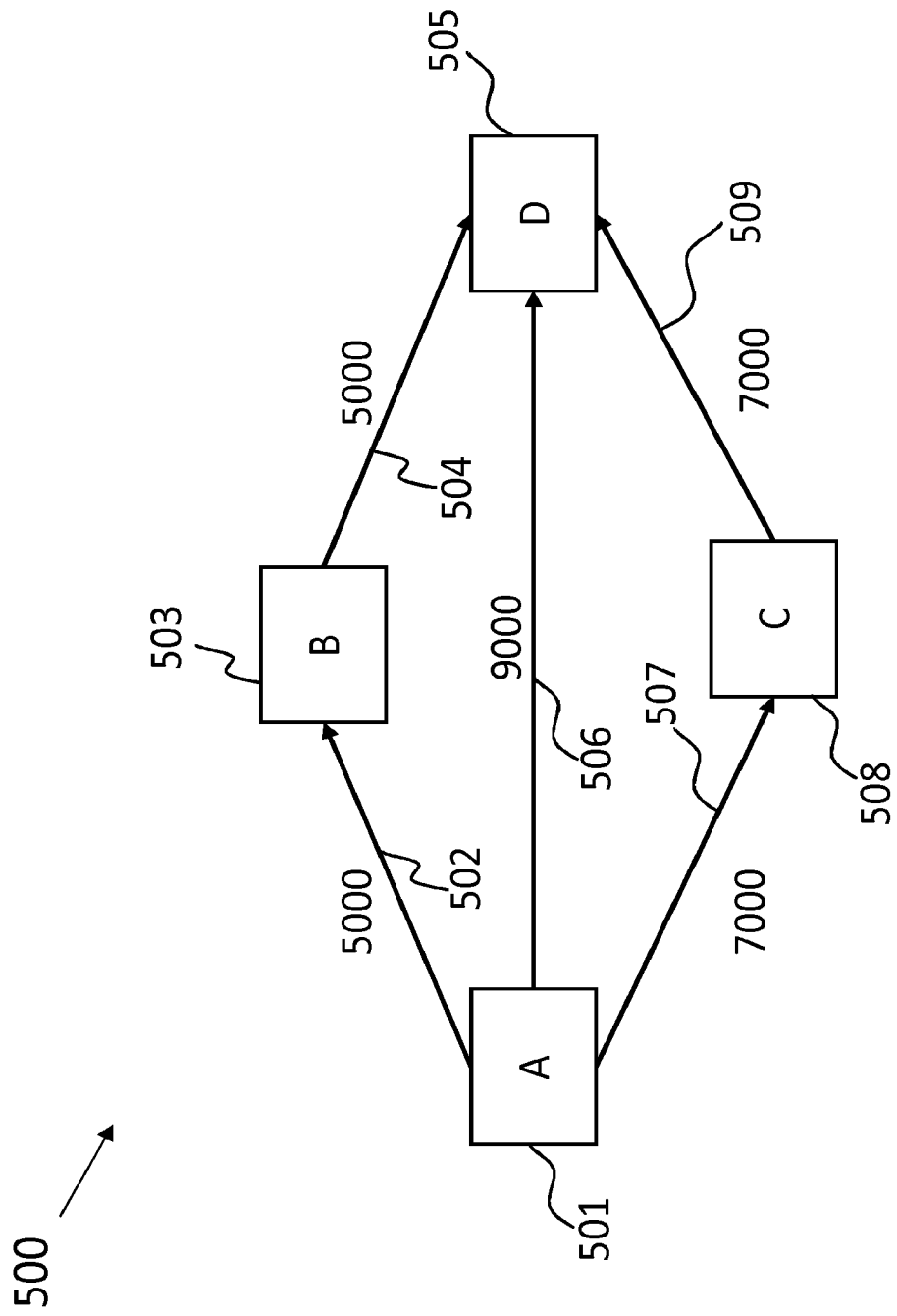
FIG. 5 shows a schematic of a network.

FIG. 5 shows a network 500 having four nodes: A 501, B 503, C 508 and D 505. Node A 501 can communicate to node B 503 via link 502, to node C via link 507 and to node D via link 506. Node B 503 can communicate node D 505 via link 504. Node C 508 can communicate with node D 505 via link 509.

In this scenario, the shortest path from node A 501 to node D 505 is the direct link 506 from node A 501 to node D 505 with the metric 9000 (compare this with the metric of 5000+5000 from node A 501 to node B 503 to node D 505 via link 502 and link 504, and with the metric of 7000+7000 from node A 501 to node C 508 to node D 505 via link 507 and link 509). If the metric of node A 501 to node B 503 via link 502 drops to 4000 from 5000, and the metric of node A 501 to node D 505 increases from 9000 to 10000, best path from node A 501 to node D 505 is found as from node A 501 to node B 503 to node D 503 with an end-to-end metric of 4000+5000=9000.

Note that a small change in the medium can result in such amount of metric change. If the level-based consistency check 211 is not applied, due to sudden but small changes in the medium, the best path may change frequently, yielding frequent packet rerouting. The metric module 200 aims at identifying the magnitude and the extent of the change in the observed physical rate, and based on these observations, aims at assessing the link quality in terms of a metric. Thus, metric module avoids frequent update of link assessments, which occur due to misleading physical rate information gathered from the driver.

It should be noted that observed slow rates might also be due to inactivity on the link. Some radios (interfaces), lower their transmission rate in the case that there is no active traffic. In such a case, the observed physical rate is not a correct representative of the achievable link capacity. Note that physical rate information obtained from the driver may not be reliable, and in such cases, routing decisions based on the unreliable data would be harmful for the entire network.

The proposed metric module 200 defines how fast a link's quality is to be adapted to. For example, a routing method may want to be reluctant to change its path decision unless a significant change occurs in the medium, or another routing method may prefer to react to only consistent differences whether they are significant or insignificant. The proposed metric module 200's behaviour can be adjusted (by tuning the parameters described herein) for the specific needs of any routing mechanism.

As described above, via the proposed metric and the proposed metric computation method, one can define and assess the quality of a link within a confidence level. Next, given that the link metrics have been determined, it is possible to use the discussed methods for finding the reliable end-to-end path between two nodes in a network.

Figure 7:
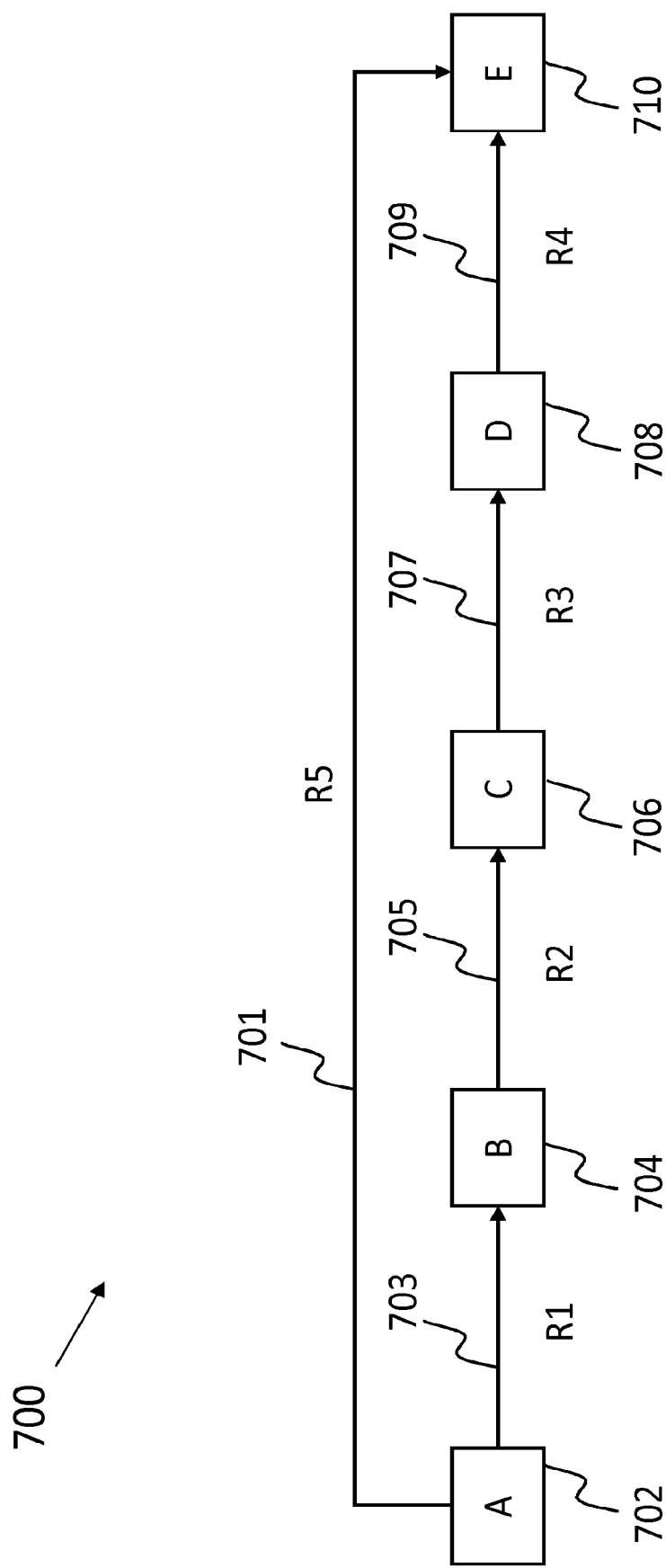
FIG. 7 shows a schematic of a network.

Consider the example scenario depicted in FIG. 7. FIG. 7 shows a network 700 having five nodes, A 702, B 704, C 706, D 708 and E 710.

Node A 702 can reach to node E 710 via two possible paths: (i) over B 704, C 706, D 708 to E 710 (via links R1 703, R2 705, R3 707 and R4 709), (ii) directly to E 710 (via link R5 701). While the multi-hop path A 702→B 704→C 706→D 708→E 710 consists of 4 fast and strong links R1 703, R2 705, R3 707, R4 709 making up the end-to-end rate Rm=(1/R1+1/R2+1/R3+1/R4)^−1, the single hop rate 701 is RS=R5. R5 may attain a better rate compared to Rm. However, Rm is composed of multiple strong links, each of which is more robust to link failures than the single slow link R5. From this point of view, although the direct link R5 is observed to provide the fastest alternative, it is more likely to suffer from channel impairments as compared to the multi-hop alternative.

If a routing algorithm takes into account only the rate information, or equally a cost metric, which is directly proportional to the rate that can be attained on the link, then the routing algorithm is likely to opt for fast but unreliable paths.

Selecting faster but less reliable paths is a common problem, which occurs mainly due to considering only one parameter for the assessment of overall link quality. If one considers only the rate information for end-to-end link quality assessment, then one selects the fastest path, but it does not guarantee reliability of the path. Likewise, if one considers only the signal strength, e.g., RSSI (received signal strength indicator), or only the SINR, information for end-to-end link quality assessment, then one may select a reliable but a rather slow path.

Furthermore, it shall be noted that, considering the example depicted in FIG. 7, it is less probable to have all intermediate links undergo heavy fading than to have the single hop to undergo slight fading. Hence, the multi-hop alternative may be a better path choice if it provides a reasonable end-to-end rate and at the same time it provides a certain guarantee for reliability.

The fastest path, almost all the time, provides also the least delay and jitter. However, the fastest path does not guarantee reliability of the end-to-end path. A dictionary definition of reliability is "performing consistently well". Although the metric module brings in link-based reliability, and provides reliable metric values, meaning that reliable link quality assessment is performed; comparison of multiple alternative end-to-end paths calls for extra information to differentiate these alternatives. For example, consider, FIG. 7, even if each link's quality is assessed with confidence, it does not guarantee end-to-end path's reliability. This example illustrates that path selection based on a single metric may be misleading, and can result in faster but less reliable end-to-end path choices. A second measure of quality can be taken into consideration when end-to-end path cost is computed.

Figure 8:
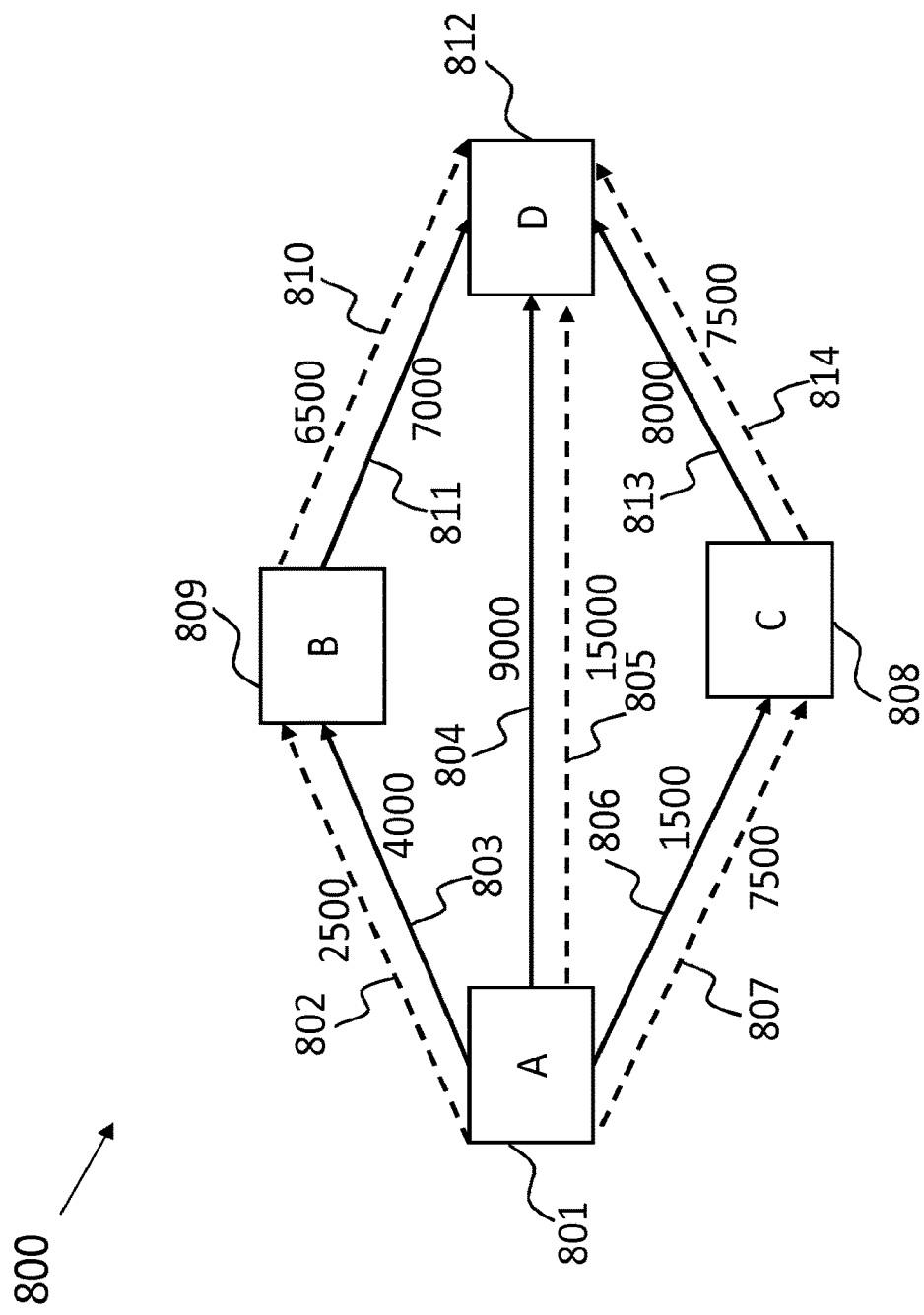
FIG. 8 shows a schematic of a network.

FIG. 8 illustrates an example scenario, where use of multiple metrics for assessing path quality is in fact beneficial. FIG. 8 shows a network 800 having four nodes: A 801, B 809, C 808 and D 812. In this example, the bold continuous lines 803, 811, 806, 813 represent PLC links, and dashed lines 802, 810, 807, 814 represent Wi-Fi links.

Node A 801 can communicate with node B via PLC link 803 and via Wi-Fi link 802. Node A 801 can communicate with node D via PLC link 804 and via Wi-Fi link 805. Node A 801 can also communicate with node C 808 via PLC link 806 and via Wi-Fi link 807. Node B 809 can communicate with node D 812 via PLC link 811 and via Wi-Fi link 810. Node C 808 can communicate with node D 812 via PLC link 813 and via Wi-Fi link 814.

In FIG. 8, the minimum cost that a path from source A to destination D can attain is 9000. Denoting Wi-Fi link as "<:>," and PLC link as "<→," the paths that provide the minimum cost are (i) A<:>B<:>D (i.e. over Wi-Fi links 802, 810), (ii) A<→D (i.e. over PLC link 804), (iii) A<→C<:>D (i.e. over PLC link 806 and Wi-Fi link 814). Note that (i) comprises two Wi-Fi links (802, 810), one having a relatively good metric, and the other having a relatively bad metric, (ii) comprises a single PLC link (804), (iii) comprises two links, one PLC link (806) with a relatively good metric, and one Wi-Fi link (814) with a relatively bad metric.

Although, according a metric comparison which takes into account a single parameter, these three path alternatives seem to be equivalent, from the point of reliability there can be significant differences between these alternatives. For instance, A<→D attains the cost 9000 by only one link (804), whereas the other alternatives (i) and (iii) use two links (802, 810 and 806, 814 respectively) that add up the same cost; hence it is likely that A<→D may be less reliable. Moreover, these alternative paths utilize different communication technologies which may impose different reliability constraints and challenges. A single metric does cover these aforementioned aspects of the path alternatives.

The method described herein enables the incorporation of multiple metrics into consideration while computing the end-to-end path cost. Each link's state is kept track of. The RSSI observed on each link is classified according to a given/pre-determined RSSI range. This classification is named as "priority state". Each link is in one priority state at a time. State transition rules are such that there is a hysteresis between the neighbour states. State boundaries overlap in one embodiment. Accordingly, a method is provided that enables the comparison of the quality of a first path and a second path, in order to determine the best quality path.

Although the description is given in terms of the metric and the RSSI, where links attain priority states with respect to the observed RSSI, further embodiments may employ different parameters for classification or prioritization of the links (for assigning priority states to the links). The method is described through an exemplary embodiment; however, the specifics of the embodiment do not impose a limitation on the proposed method.

The cost of a link is quantified in terms of a metric, which is a function of the physical rate that can be attained on that link. The metric is a logarithmic function of physical rate, and it denotes the amount of airtime that can be utilized on that link. As the physical rate that can be attained on a link decreases, the metric on that link increases exponentially. In the following, unless otherwise is explicitly specified, metric is used as a generic term that quantifies the link quality based on airtime (or equivalently, inverse of rate) but it is not used to specifically refer to the proposed metric or the proposed metric computation method described herein, although the proposed metric can be used in this regard as well.

The cost of a path is defined as the aggregate sum of the metric of each link on the path. In one embodiment, the metric of a link is unidirectional, in that, link metric is defined to be a function of the directional link metrics, e.g., the maximum of the metrics observed on either direction between the two nodes is defined to be the link metric. In such a case, aggregate metric cost of the path between the source and the destination is the same in either direction. In other embodiments, the metric of a link is kept directional; thus aggregate metric cost of the path between the source and the destination may not be the same in either direction.

Ad Hoc on demand distance vector routing (AODV) is one of the prevalent routing methods being used in wireless ad hoc and mesh networks. Here, an exemplary embodiment of a reliable path selection method is given considering a network that implements AODV. However, the method is not bounded by the limitations imposed by AODV. The method can be implemented in any routing protocol by making use of the descriptions provided here.

In AODV, a valid path between a source and a destination pair is discovered by dissemination of Route Request (RREQ) messages initiated by the source and dissemination of Route Reply (RREP) messages in return by the destination node. A generic AODV-based route discovery comprises the following steps:

1. The source node initiates route discovery by sending a RREQ message to its immediate neighbours. In RREQ, the source node designates the final destination MAC address, i.e., the address of the node it is trying to find a path to.

The RREQ message carries the aggregated cost information of the path starting at the source and ending at the receiver of the RREQ message. This cost information is updated at every hop the RREQ message traverses. The transmitter of the RREQ message adds the cost (metric) of the link between the transmitter and the receiver of the RREQ to the cost that is associated with the cost of this path up until itself. In the case of the source node, since the source is the originator of the RREQ message and there is no previous cost associated with a path, the source node puts the metric information of the link between itself and the receiver of the RREQ message. In this way, receiver of a RREQ message learns the cost of the path that starts at the source and ends at itself. Note that the receiver of the RREQ message does not know specific metric information about any individual link on this path, but it only knows the aggregate cost of the entire path.

2. When the destination node receives a RREQ message, it responds by a RREP message. The destination node replies back to the RREQ using the following policy:

a. If there is no previously discovered path associated with this source address, the destination sends a RREP to the node it received the respective RREQ from. In this message, similar to path cost update in RREQ propagation, the destination node designates the metric of the link between itself and the receiver of the RREP.

b. If there is a previously known path associated with this source address, the destination node checks if the aggregated path cost designated in the newly arrived RREQ message is lower than the path cost of the already known path. If so, the destination node replies back with a RREP; otherwise, the destination node ignores the RREQ.

3. When an intermediate node receives a RREQ message, it updates the aggregated path cost and forwards the RREQ.

4. The RREP message initiated by the destination node propagates in the network in the same way as RREQ message propagates. In that, the transmitter of the RREP message adds the cost of the link between the transmitter and the receiver of the RREP to the cost that is associated with the cost of this path up until itself. In the case of the destination node, since the destination is the originator of the RREP message and there is no previous cost associated with a path, the source node puts the metric information of the link between itself and the receiver of the RREP message. In this way, receiver of a RREP message learns the metric cost of the path that starts at the source and ends at itself. Note that the receiver of the RREP message does not know specific metric information about any individual link on this path, but only knows the aggregate metric cost of the entire path.

5. Selection among alternative paths is carried out at the source node. The source node selects the path that provides the least aggregate cost among alternative paths.

Specifically, a. If there is no previously discovered path associated with this destination, then the source selects the path designated by the firstly arrived RREP.

b. If there is a previously discovered path associated with this destination, then the source compares the aggregate cost designated in the RREP with the aggregate cost of the already selected path.
  i. if the aggregate cost of the alternative path is found to be lower than the already selected path, then the alternative path is selected as the route to the destination,
  ii. otherwise the source ignores the path alternative.

It shall be noted that the route discovery protocol described above relies solely on selecting the path that minimizes the end-to-end aggregate cost, i.e., the aggregate metric. However, from the above discussion, it is clear that a single parameter (such as a metric) is not sufficient to find out the fastest and the most reliable path.

The cost of a path is denoted in terms of a cost tuple: [priority, metric]. 'Metric' denotes a parameter that is the end-to-end, i.e., from the source AP to the destination AP, aggregated metric. 'Priority' denotes the priority state assigned to each link on the path, thereby to provide a classification to each link on the path. The RSSI of a link is defined as the minimum of RSSIs on either direction of the link; likewise Signal to Noise Ratio (SNR) of a link is defined as the minimum of SNRs on either direction of the link; and also, the metric of a link is defined as the maximum of metrics on either direction of a link.

There are N different priority states that a link can attain, particularly, "1" represents the highest priority, and "N" denotes the lowest priority. In one exemplary embodiment, N is set as 8. However, in further examples, N can be varied. Each priority state corresponds to a range of RSSI values for Wi-Fi links, and a range of SNR values for PLC links.

In further examples, different metrics are used to determine the priority state for different types of communication links. By determining a parameter and classification of a first path and a parameter and classification of a second path, the quality of the first path can be determined and compared with the quality of the second path, thereby to determine the best quality path to route data. In some examples, the parameters of the first path and the second path are uncorrelated. In some examples, the parameter of the first path is uncorrelated with the classification of the first path and the parameter of the second path is uncorrelated with the classification of the second path. Advantageously, different metrics are used to assess different path qualities in order to help make decisions and to provide improved communication within a network.

Figure 9:
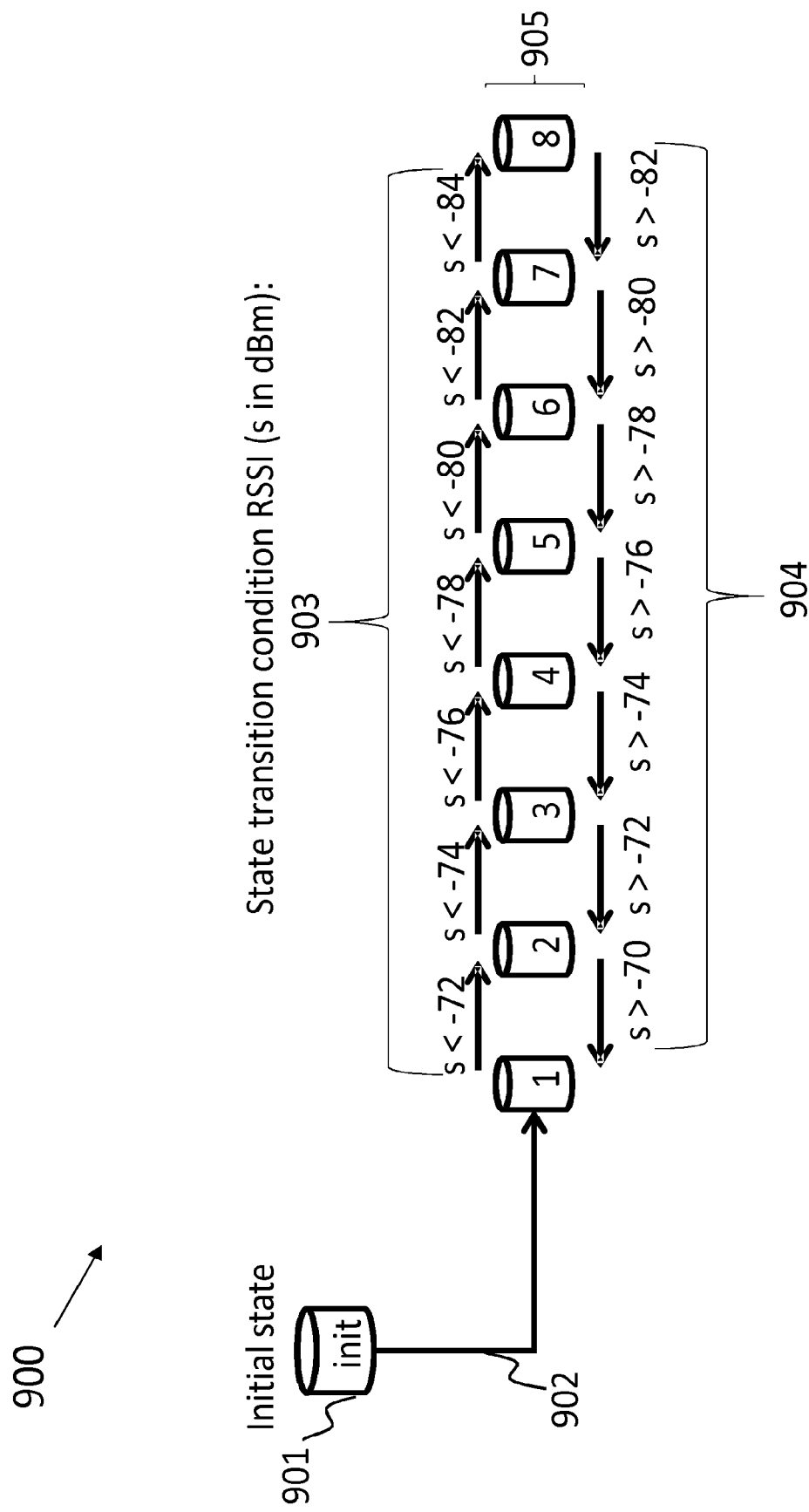
FIG. 9 is a priority state diagram.
Figure 10:
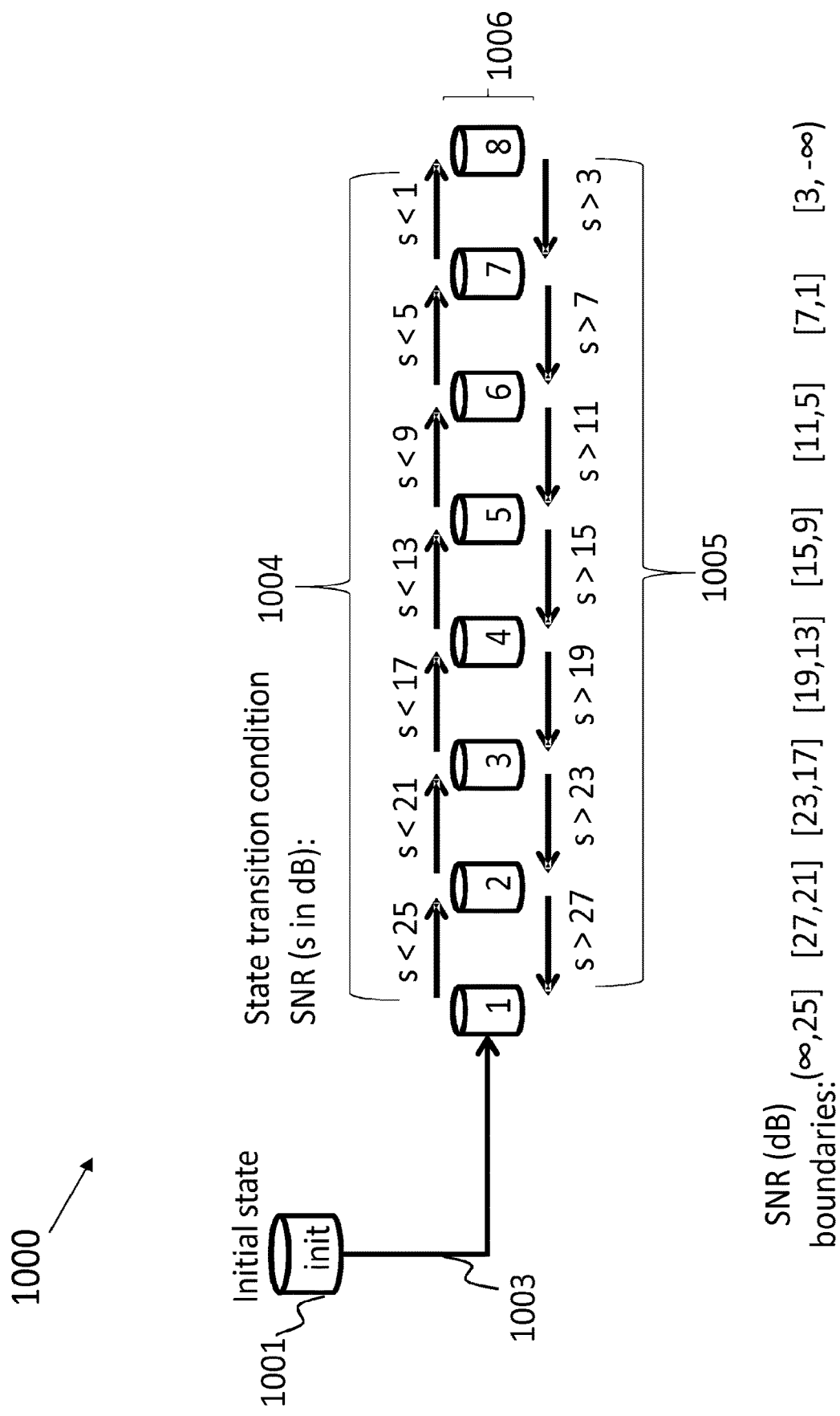
FIG. 10 is a priority state diagram.

FIG. 9 depicts the priority state transition diagram for Wi-Fi links, and FIG. 10 illustrates the priority state transition diagram for PLC links.

FIG. 9 is a priority state diagram 900 having an initial state 901. There are eight different priority states 905 shown at FIG. 9. 1 is the highest of the priority states 905, 8 is the lowest of the priority states 905.

FIG. 9 shows the state transition condition 903 in order to move between each of the priority states 905. In the example of FIG. 9, the state transition condition is that s (measured in dBm) is less than the corresponding RSSI. For example, the state transition condition between priority state 1 and priority state 2 is that s is less than −72 dBm. The state transition condition between priority state 2 and priority state 3 is that s is less than −74 dBm. The state transition condition between priority state 3 and priority state 4 is that s is less than −76 dBm. The state transition condition between priority state 4 and priority state 5 is that s is less than −78 dBm. The state transition condition between priority state 5 and priority state 6 is that s is less than −80 dBm. The state transition condition between priority state 6 and priority state 7 is that s is less than −82 dBm. The state transition condition between priority state 7 and priority state 8 is that s is less than −84 dBm.

The state transition condition between priority state 8 and priority state 7 is that s is greater than −82 dBm. The state transition condition between priority state 7 and priority state 6 is that s is greater than −80 dBm. The state transition condition between priority state 6 and priority state 5 is that s is greater than −78 dBm. The state transition condition between priority state 5 and priority state 4 is that s is greater than −76 dBm. The state transition condition between priority state 4 and priority state 3 is that s is greater than −74 dBm. The state transition condition between priority state 3 and priority state 2 is that s is greater than −72 dBm. The state transition condition between priority state 2 and priority state 1 is that s is greater than −70 dBm.

The boundaries for the priority states 905, representing the RSSI measured in dBm are as follows: priority state 1: (∞,−72], priority state 2: [−70, −74], priority state 3: [−72, −76], priority state 4: [−74, −78], priority state 5: [−76, −80], priority state 6: [−78, −82], priority state 7 [−80,−84], priority state 8: [−82, −∞).

FIG. 10 is a priority state diagram 1000 having an initial state 1001. There are eight different priority states 1006 shown at FIG. 10. 1 is the highest of the priority states 905, 8 is the lowest of the priority states 1006.

FIG. 10 shows the state transition condition 1004 in order to move between each of the priority states 1006. In the example of FIG. 10, the state transition condition is that s (measured in dB) is less than the corresponding SNR. For example, the state transition condition between priority state 1 and priority state 2 is that s is less than 25 dB. The state transition condition between priority state 2 and priority state 3 is that s is less than 21 dB. The state transition condition between priority state 3 and priority state 4 is that s is less than 17 dB. The state transition condition between priority state 4 and priority state 5 is that s is less than 13 dB. The state transition condition between priority state 5 and priority state 6 is that s is less than 9 dB. The state transition condition between priority state 6 and priority state 7 is that s is less than 5 dB. The state transition condition between priority state 7 and priority state 8 is that s is less than 1 dB.

The state transition condition between priority state 8 and priority state 7 is that s is greater than 3 dB. The state transition condition between priority state 7 and priority state 6 is that s is greater than 7 dB. The state transition condition between priority state 6 and priority state 5 is that s is greater than 11 dB. The state transition condition between priority state 5 and priority state 4 is that s is greater than 15 dB. The state transition condition between priority state 4 and priority state 3 is that s is greater than 19 dB. The state transition condition between priority state 3 and priority state 2 is that s is greater than 23 dB. The state transition condition between priority state 2 and priority state 1 is that s is greater than 27 dB.

The boundaries for the priority states 905, representing the SNR measured in dB are as follows: priority state 1: ($\infty$, 25], priority state 2: [27, 21], priority state 3: [23, 17], priority state 4: [19, 13], priority state 5: [15, 9], priority state 6: [11, 5], priority state 7 [7, 1], priority state 8: [3, $-\infty$).

As illustrated in the diagrams in FIG. 9 and in FIG. 10, initially all links are in priority state 1. Considering Wi-Fi links (as described with respect to FIG. 9), a link that attains priority state 1 can transition to state 2, when the RSSI observed on that link falls below −70 dBm. Likewise, a link that attains priority level 2 can transition to state 1, when the RSSI observed on that link becomes greater than −68 dBm. Other state transitions follow a similar policy, as illustrated in FIG. 9.

Similarly, considering PLC links (as described with respect to FIG. 10), a link that attains priority state 1 can transition to state 2 when the SNR observed on that link falls below 25 dB. Likewise, a link that attains priority level 2 can transition to state 1, when the SNR observed on that link becomes greater than 27 dB. Other state transitions follow a similar policy, as illustrated in FIG. 10.

For the sake of simplicity, transition rules between non-neighbour states are not illustrated in FIG. 9 and FIG. 10. However, it should be noted that, for example, if the transition rule between state 7 and state 8 occurs when the state is, say 1, then the state transitions from 1 directly to state 8 without traversing the states in between. To illustrate, consider Wi-Fi links, let it be assumed that link is at state 2, and the RSSI drops to −77 dBm. In such a case, the priority state transitions directly from 2 to 5.

It is worthwhile to note that state transition rules are designated such that priority assigned to a link does not change frequently due to slight but abrupt changes in the wireless medium. This is achieved by not letting the current state transition to a neighbour state unless the observed RSSI exceeds the boundary of its neighbour state by a margin of 2 dB for both Wi-Fi and PLC links. This margin can be set to different values in different examples.

Priority entry of the cost tuple includes 8 sub-entries, one for each priority state. Each node that forwards RREQ and RREP adds its link into its respective entry. This way, the receiver of the RREQ/RREP message learns about the number of hops on the path as well as the number of links that belong to each priority state.

For example, consider the scenario where a source node has two links: one to node A with a priority state of 1 and a metric of 2500, and the other to node B with a priority state of 3 and a metric of 3000. The cost tuple sent with the RREQ issued by the source node looks like as follows. The RREQ sent to node A: [1,0,0,0,0,0,0,0; 2500]. The RREQ sent to node B: [0,0,1,0,0,0,0,0; 3000]. Furthermore, let's assume that node A has a connection to the destination with a priority state of 4 and a metric of 4000, and node B has a connection to the destination with a priority state of 3 and a metric of 3500. The RREQ sent by node A to destination includes the following cost tuple: [1,0,0,1,0,0,0,0; 6500], likewise the RREQ sent by node B to destination includes the following cost tuple: [0,0,2,0,0,0,0,0; 6500].

Priority of a path is determined by the link that has the minimum priority among all links on the path. For example, for a path with the following cost tuple [1,2,0,1,0,1,0,0; 12500], the priority of the path is found to be "6".

The priority radius is defined as the parameter that designates the vicinity of states within which the metric comparison is valid. For example, if the priority radius is set as 2, and the highest priority among path alternatives is 2, then metric comparison is valid among the path candidates with the priority states of 2, 3 and 4. In one embodiment, priority radius can be zero, meaning that metric comparison is valid only if the path candidates are of the same priority, otherwise the higher priority path prevails.

The average (metric) cost per hop (ACPH) of a path is defined as the aggregated end-to-end cost divided by the total number of hops on this path.

When the RREQ reaches the destination, the destination node compares the priority states of different path alternatives that have arrived. Note that, the destination AP replies back to a RREQ message immediately if it has not received a better alternative, with the same sequence number, before the arrival of this RREQ; however, if the destination has replied back to a RREQ but received another RREQ with a better priority state, then replies back with a RREP, as well.

RREP is propagated along the way from the destination to the source node, like the way RREQ is forwarded. The RREP message that reaches the source AP comprises the following information: (i) priority state, and (ii) aggregated end-to-end (metric) cost. In the event that the destination AP receives multiple RREQ messages with the same or higher sequence numbers, and also, in the event that the source AP receives multiple RREP messages with the same or higher sequence numbers, the source/destination AP selects the best path according to the Path Comparison policy described below.

Path comparison is carried out by source, intermediate and destination nodes. An intermediate node updates and sets its backward (towards the node that initiates the route discovery) path vector, upon reception of RREQ messages. Source node makes path comparison upon reception of RREP messages that represent different paths to the same destination node. Destination node makes path comparison upon reception of RREQ messages. Like an intermediate node, the destination node sets its backward path vector towards the node that represents the best path among alternatives reaching itself.

Note that path comparison rule is carried out only for selection of a route; path comparison rule may not be utilized for a decision on forwarding RREQ or RREP messages. Intermediate nodes may forward RREQ/RREP messages, if the end-to-end aggregated (metric) cost indicated by the candidate RREQ/RREP is lower than the current path's cost or the priority state indicated in the candidate RREQ/RREP is better than the current path's priority state.

Furthermore, the proposed method incorporates three different working modes for path comparison that is applied after path reduction. Specifically, 1. when the priority radius is set as "0", path comparison is carried out solely based on priority of the candidate paths, i.e., the best path is the path the weakest link of which is the strongest among all alternative paths. In case there are more than one path alternative with the highest priority state, then metric comparison is carried out among these alternatives.
2. when the priority radius is set as "8", which is the maximum number of priority states, path comparison is carried out solely based on aggregated (end-to-end metric) cost of the candidate paths, i.e., the best path is the path which provides the minimum aggregated end-to-end (metric) cost;
3. when the priority radius is set as "n", where n is integer and 0<n<8, path comparison is carried out via a combination of aggregated (end-to-end metric) cost of the candidate paths as well as the priority of the candidate paths. The details of this mode is described below.

When the priority radius is set to 0. Path comparison is carried out via the following algorithm:

1. Starting from the common worst priority link among the path alternative pairs, omit the links that attain the same priority state, and obtain reduced path vectors.

For example, consider the following three path alternatives:

Path-1: [2, 1, 1, 0, 0, 0, 0, 0; 12500]
Path-2: [1, 1, 1, 0, 0, 0, 0, 0; 9000]
Path-3: [3, 0, 1, 0, 0, 0, 0, 0; 11000]

Pair-wise reduction carried out between Path-1 and Path-2 produces:

Reduced Path-1: [1, 0, 0; 12500]
Reduced Path-2: [1, 0, 0; 9000]

According to the result, these two paths have the same priority state. Metric comparison is required to resolve which one is better. Path-2 is favoured over Path-1 since it has lower metric cost.

Since Path-2 is favoured over Path-1, next pair-wise reduction is carried out between Path-2 and Path-3, which produces:

Path-2: [1, 1, 0; 9000]
Path-3: [2, 0, 0; 11000]

According to the result, Path-3 attains higher priority than Path-2. Thus, Path-3 is favoured over Path-2.

2. Based on the pair-wise results obtained by reduction, sort the alternative paths in descending order of preference. The most reliable path is found to be the head of the sorted list. Considering the above example, the sorted candidate list in order of reliability is follows: Path-3, Path-2, and Path-1, out of which Path-3 is selected as the most reliable path.

When the priority radius is set to n, 0<n<N. Path comparison is carried out via the following algorithm:

1. Starting from the common worst priority link among the path alternative pairs, omit the links that attain the same priority state, and obtain reduced path vectors.

For example, consider the following three path alternatives:

Path-1: [2, 1, 1, 0, 0, 0, 0; 12500]
Path-2: [1, 1, 1, 0, 0, 0, 0; 9000]
Path-3: [3, 0, 1, 0,0, 0, 0,0; 11000]

Reduction is carried out between Path-1, Path-2 and Path-3, which produces:

Reduced Path-1: [2, 1, 0; 12500]
Reduced Path-2: [1, 1, 0; 9000]
Reduced Path-3: [3, 0, 0; 11000]

If a path outperforms the other candidate paths in priority, in that the priority of a path exceeds the current selected path beyond the radius (e.g. current selected path has a priority level of 5, but the new candidate has priority level of 1, where the priority radius is 2), then check if ACPH is decreased. If the candidate path decreases ACPH, then select this candidate path; otherwise, disregard the candidate path.

Check if the total aggregated cost is not increased by more than x % of the current cost. That is to say, if the total aggregated cost of the candidate (highest priority) path is x % higher than the current path, then disregard this candidate path. The amount of hysteresis, x %, in one embodiment is 10%.

According to the result, Path-3 has priority state of 1, and Path-1 and Path-2 attains priority state of 2. Since the priority radius is greater than zero, all path alternatives are within the same priority vicinity, which calls for metric comparison among the alternatives. Path-2 is favoured over all alternatives since it provides the minimum metric among the alternatives within the same priority radius.

An important point to pay extra attention is the possible hardware limitations imposed on some interfaces, which may limit the achievable throughput. For example, a PLC throughput cap may be encountered at Ethernet interfaces of some PLC-capable devices. Due to this limitation, the achievable throughput on the PLC link cannot exceed 95 Mbps, even though the PLC physical rate is such high that it would yield throughput much higher than 95 Mbps if it were not capped. It is also worthwhile to note that since PLC link is capped, the maximum metric that can be attained by a PLC link is 10000. That is to say, a PLC link can take metric values from 10000 to 50000, whereas a Wi-Fi link can take metric values from 2500 to 50000. This limitation is being taken into account by the use of priority states. Thus, a PLC link with a metric of 10000 can be favoured over a Wi-Fi link with a metric of 8333, if the Wi-Fi link has a priority state lower than the one PLC link has.

This can be illustrated by the following example. Consider a PLC link with a priority state of 1 and a metric of 10000, which correspond to an SNR of at least 25 dB, and User Datagram Protocol (UDP) throughput of at least 80 Mbps. Also, consider a Wi-Fi link, say link A, with a priority state of 4 and a metric of 8333. If the priority radius is chosen as 2 or less, although the Wi-Fi link yields the better metric, the PLC link is favoured over link A, since it has a better priority state, which is beyond priority radius, than the link A has. Furthermore, consider another Wi-Fi link, say link B, with a priority state of 3 and a metric of 8333. If, again, priority radius is chosen as 2 or less, link B is favoured over the PLC link, since it has a better metric value in comparison to the PLC link.

It should be noted that, especially in case of PLC, the priority state not only serves as means to determine the reliability of the link but also it serves as means to determine (or at least, to recognize) the achievable capacity of the link. In that, facilitating the SNR information can differentiate the PLC links with the same metric, which are encountered due to the UDP throughput limitation. Thus, it can be said that priority states provide means for making use of the SNR information instead of the UDP throughput information which is misleading due to capacity limitation.

The method incorporates a compatibility extension. The devices that run the method can operate together with the legacy devices (legacy devices are the devices that do not implement the proposed invention) with the help of the proposed compatibility extension.

The goal of the compatibility extension is (i) to be able to utilize the proposed priority based path selection method (new rule) even in a network with a mixture of legacy and new nodes. For example, if the path does not traverse a legacy node, then the nodes should be able to select the path according to the new rule. That is to say, in a mixed network, both legacy and new methods could be used at the same time depending on where the traffic flows; (ii) to resolve compatibility issue within the operation of the algorithm itself, such that the algorithm itself is capable of handling legacy and new nodes, and the algorithm can operate efficiently in a mixed network, without the need to completely shut down the algorithm; and (iii) to avoid extra logic and messaging to revert the new nodes to legacy mode.

Figure 11:
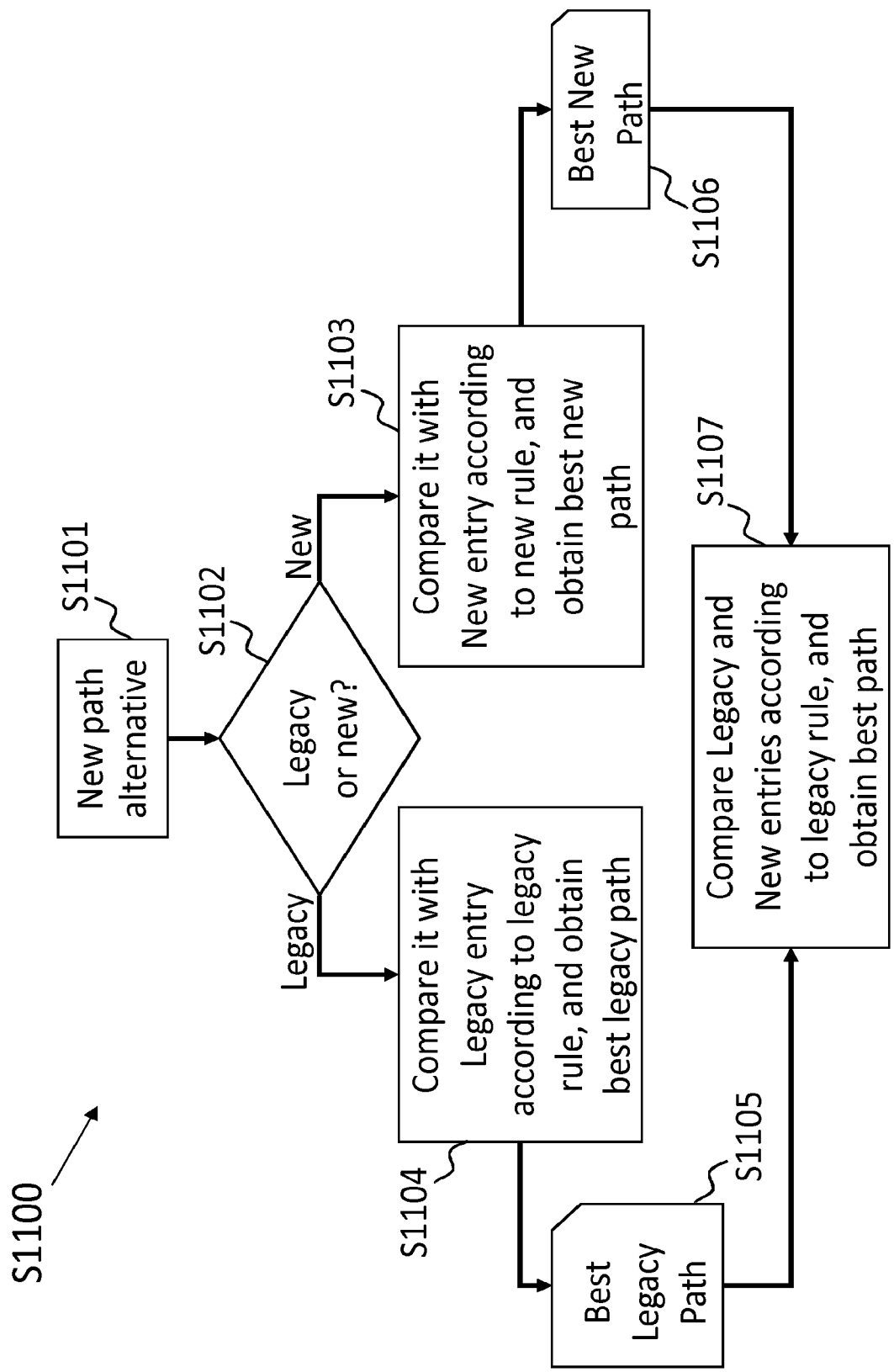
FIG. 11 is a flow diagram for compatibility extension.

New nodes maintain two separate entries for cost comparison, namely Legacy and New. If the cost information of a path does not involve priority information, then this cost is regarded as Legacy. If the cost information of a path involves priority information, then this cost is regarded as New. There can be only one entry in Legacy, and there can be only one entry in New. Flow diagram S1100 for the compatibility extension is depicted in FIG. 11.

The process of compatibility extension begins at step S1101, when there is a path candidate for a new path alternative. The process moves to step S1102, where it is determined if the path is a legacy path or a new path. If the path is a new path and involves priority info, then this path's cost is compared with the cost stored in the New entry at step S1103. If the candidate path has a better priority, or it has the same priority but it has a better metric, then the New entry is updated with the candidate. Otherwise, New entry is not updated. The process then moves to step S1106, where the best new path is determined.

If it is determined that the path is a legacy path at step S1102, the process moves to step S1104, as it does not involve priority info. At step S1104, the legacy path's cost is compared with the cost stored in the Legacy entry. If the candidate has better metric, then the Legacy entry is updated with the candidate. Otherwise, Legacy entry is not updated. The process then moves to step S1105, where the best legacy path is determined.

The process then moves from the selection of the best legacy path at step S1105 and the selection of the best new path at step S1106 to step S1107. At step S1107, the best path is selected according to a comparison of legacy and new entries based on legacy rule. Note that if there is no legacy entry, then legacy comparison is never carried out.

With the compatibility extension RREQ forwarding rule is modified as described with reference to FIG. 12.

Figure 12:
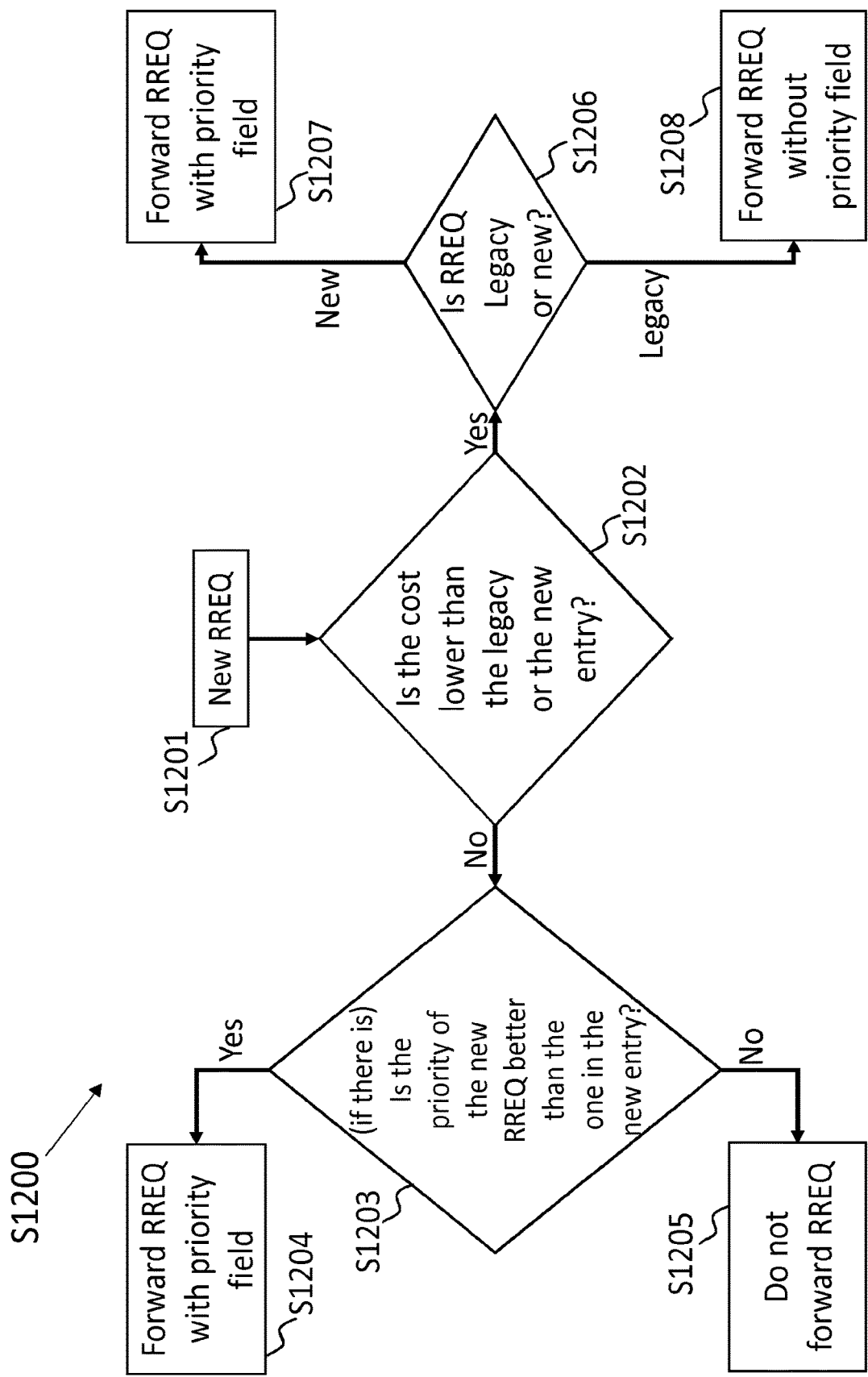
FIG. 12 is a flow diagram of RREQ forwarding compatibility extension.

The flow diagram S1200 of RREQ forwarding in the compatibility extension is given in FIG. 12. The process begins with a new RREQ at step S1201. It is then determined at step S1202 if the cost is lower than the legacy or the new entry. If the cost is lower than the legacy or the new entry, the process moves to step S1206, where it is determined if the RREQ is a legacy RREQ or a new RREQ. If the RREQ is a legacy RREQ, the process moves to step S1208, where the RREQ is forwarded without the priority field. If it is determined at step S1206 that the RREQ is a new RREQ, the RREQ is forwarded with the priority field at step S1207.

New nodes maintain two entries, namely legacy and new, for cost and priority comparison. When a RREQ without a priority field is received, the node places this cost into the "legacy" entry. When a RREQ with a priority field is received, the node places this cost into the "new" entry. When a new node receives a RREQ without a priority field, it forwards the RREQ without attaching priority info. That is to say, if a RREQ is originated by a legacy node, then this RREQ is forwarded within the network without any priority info. In a network that consists of only new nodes, there is never a path in legacy entry, hence all comparisons are done based on the new rule.

If it is determined at step S1202 that the cost is not lower than the legacy entry or the new entry, the process moves to step S1203, where it is asked, if there is a priority state, if the priority of the new RREQ is better than the one in the new entry. If it is determined that the priority is not better, the process moves to step S1205, and the RREQ is not forwarded. If it is determined that the priority is better, the process moves to step S1204 and the RREQ is forwarded with the priority field.

Therefore, if a RREQ with a better metric value than the last forwarded RREQ's metric is received, then RREQ is forwarded. If a RREQ with a better priority value than the last forwarded RREQ's priority is received, then RREQ is forwarded. A RREQ message received without priority field is forwarded without priority field.

Legacy nodes maintain one entry for cost comparison. Since legacy nodes cannot parse priority field, they only take into account the cost field. That is to say, priority field is ignored by the legacy nodes. If RREQ is originated by a legacy node, then this RREQ traverses the network as a legacy RREQ. That is to say, even if there are new nodes on the path, these new nodes do not append the priority field to the RREQ received without the priority field. If RREQ is originated by a new node, and if this RREQ traverses at least one legacy node, then RREQ loses its priority field starting from the legacy node.

The invention claimed is:

1. A method implemented by a device, the method comprising:
receiving measurements of at least one parameter for each link of a first path between a start node and an end node, wherein the first path comprises a first set of links between the start node and the end node, wherein each link uses a single communication technology comprising a power line communication (PLC) technology, ethernet technology, or wireless technology;
receiving measurements of at least one parameter for each link of a second path between the start node and an end node, wherein the second path comprises a second set of links between the start node and the end node, wherein the first set of links and the second set of links differ in at least one link using a different communication technology;
converting the measurement of each link to an expected throughput based on the communication technology of the link;
determining a link metric of each link based on the expected throughput, wherein determining the link metric for each link further includes performing level-based hysteresis with consistency check on each link based on the expected throughput, wherein the link metric is determined based on an equation where the link metric is equal to an absolute value of K over ([floor operator of: R/L]+1), where K is a predetermined number that designates a worst metric that can be output and R represents an expected throughput, and L is a step size for a quantization of a range of possible measurements of qualities;

determining a first path metric for the first path by adding each link metric of the first set of links;

determining a second path metric for the second path by adding each link metric of the first set of links;

comparing the first path metric to the second path metric; and transmitting information using the first path or the second path from the start node to the end node based on the comparison.

2. The method of claim 1, wherein the converting is performed base on a look-up table with respect to each link's respective communication technology and measurement.

3. The method of claim 1, wherein the converting is performed based on a function of the measurement of each link and the respective communication technology for that link.

4. The method of claim 1, wherein the parameter is one of: a physical parameter, physical sample rate, signal to noise ratio, signal to interference plus noise ratio, modulation and coding scheme index value, available airtime, interference, or signal strength.

5. The method of claim 1, wherein the comparing is based on a threshold difference between the first path metric and the second path metric.

6. The method of claim 1, wherein predetermined outlier samples are eliminated from the measurements by pre-filtering prior to converting the measurement of each link to an expected throughput.

7. The method of claim 1, wherein determining the link metric for each link further includes using an N-sample sliding window pre-filter on the expected throughput.

8. The method of claim 7, wherein determining the link metric for each link further includes filtering relevant samples that are an output of the N-sample sliding window pre-filter.

9. The method of claim 8, wherein determining the link metric for each link further includes converting a forecasted throughput that is an output of the filtering to generate a candidate metric, wherein the candidate metric is used in performing level-based hysteresis with consistency check.

10. A device, the device comprising:

a receiver operatively coupled to a processor, the receiver configured to receive measurements of at least one parameter for each link of a first path between a start node and an end node, wherein the first path comprises a first set of links between the start node and the end node, wherein each link uses a single communication technology comprising a power line communication (PLC) technology, ethernet technology, or wireless technology;

the receiver configured to receive measurements of at least one parameter for each link of a second path between the start node and an end node, wherein the second path comprises a second set of links between the start node and the end node, wherein the first set of links and the second set of links differ in at least one link using a different communication technology;

the processor configured to convert the measurement of each link to an expected throughput based on the communication technology of the link;

the processor configured to determine a link metric of each link based on the expected throughput, wherein determining the link metric for each link further includes performing level-based hysteresis with consistency check on each link based on the expected throughput, wherein the link metric is determined based on an equation where the link metric is equal to an absolute value of K over ([floor operator of: R/L]+ 1), where K is a predetermined number that designates a worst metric that can be output and R represents an expected throughput, and L is a step size for a quantization of a range of possible measurements of qualities;

the processor configured to determine a first path metric for the first path by adding each link metric of the first set of links;

the processor configured to determine a second path metric for the second path by adding each link metric of the first set of links;

the processor configured to compare the first path metric to the second path metric; and the processor operatively coupled to a transmitter, the processor and transmitter configured to transmit information using the first path or the second path from the start node to the end node based on the comparison.

11. The device of claim 10, wherein the converting is performed base on a look-up table with respect to each link's respective communication technology and measurement.

12. The device of claim 10, wherein the converting is performed based on a function of the measurement of each link and the respective communication technology for that link.

13. The device of claim 10, wherein the parameter is one of: a physical parameter, physical sample rate, signal to noise ratio, signal to interference plus noise ratio, modulation and coding scheme index value, available airtime, interference, or signal strength.

14. The device of claim 10, wherein the comparing is based on a threshold difference between the first path metric and the second path metric.

15. The device of claim 10, wherein predetermined outlier samples are eliminated from the measurements by pre-filtering prior to converting the measurement of each link to an expected throughput.

16. The device of claim 10, wherein determining the link metric for each link further includes using an N-sample sliding window pre-filter on the expected throughput.

17. The method of claim 16, wherein determining the link metric for each link further includes filtering relevant samples that are an output of the N-sample sliding window pre-filter.

18. The method of claim 17, wherein determining the link metric for each link further includes converting a forecasted throughput that is an output of the filtering to generate a candidate metric, wherein the candidate metric is used in performing level-based hysteresis with consistency check.

* * * * *